(12) United States Patent
Kasbar

(10) Patent No.: US 10,792,557 B1
(45) Date of Patent: Oct. 6, 2020

(54) MEMORY PUZZLE SYSTEM

(71) Applicant: Gemiini Educational Systems, Inc., Spokane, WA (US)

(72) Inventor: Laura Marie Kasbar, Newport Beach, CA (US)

(73) Assignee: Gemiini Educational Systems, Inc., Spokane, WA (US)

( * ) Notice: Subject to any disclaimer, the term of this patent is extended or adjusted under 35 U.S.C. 154(b) by 20 days.

(21) Appl. No.: 16/355,496

(22) Filed: Mar. 15, 2019

Related U.S. Application Data

(60) Provisional application No. 62/644,293, filed on Mar. 16, 2018.

(51) Int. Cl.
*A63F 13/00* (2014.01)
*A63F 9/00* (2006.01)
*G06F 3/01* (2006.01)
*A63F 13/67* (2014.01)
*A63F 9/18* (2006.01)
*A63F 13/46* (2014.01)
*A63F 13/213* (2014.01)

(52) U.S. Cl.
CPC .............. *A63F 9/0098* (2013.01); *A63F 9/18* (2013.01); *A63F 13/213* (2014.09); *A63F 13/46* (2014.09); *A63F 13/67* (2014.09); *G06F 3/013* (2013.01); *A63F 2009/186* (2013.01)

(58) Field of Classification Search
None
See application file for complete search history.

(56) References Cited

U.S. PATENT DOCUMENTS

| 4,869,589 | A | * | 9/1989 | Blair | A61B 3/02 351/243 |
|---|---|---|---|---|---|
| 8,287,281 | B2 | * | 10/2012 | Karkanias | G09B 7/02 434/236 |
| 9,308,445 | B1 | * | 4/2016 | Merzenich | A63F 13/80 |
| 9,521,175 | B2 | * | 12/2016 | Rogers | G10L 15/00 |
| 10,540,492 | B1 | * | 1/2020 | Norris, III | G06F 21/36 |
| 2005/0228785 | A1 | * | 10/2005 | Wolcott | A61B 5/16 |
| 2008/0138783 | A1 | * | 6/2008 | Karkanias | G09B 7/02 434/322 |
| 2009/0290848 | A1 | * | 11/2009 | Brown | H04N 5/247 386/223 |

(Continued)

*Primary Examiner* — Paul A D'Agostino
(74) *Attorney, Agent, or Firm* — Knobbe Martens Olson & Bear LLP

(57) ABSTRACT

Systems and methods for generating a memory puzzle are provided. In one aspect, a memory puzzle system receives a selection of puzzle parameters via a first user interface. The memory puzzle system can obtain a plurality of media files associated with the puzzle parameters, and determine an order in which to play the plurality of media files. The memory puzzle system can also generate user interface data that, when rendered, causes a client system to display a second user interface that plays the plurality of media files in the determined order. The memory puzzle system can obtain thumbnails associated with the plurality of media files that are displayed in the second user interface after playback of the plurality of media files is complete. The memory puzzle system can receive an ordered selection of the thumbnails, and generate a score based at least partly on the ordered selection of the thumbnails.

20 Claims, 8 Drawing Sheets

(56) References Cited

U.S. PATENT DOCUMENTS

| | | | | |
|---|---|---|---|---|
| 2011/0098108 A1* | 4/2011 | Kuper | .................... | A63F 13/60 |
| | | | | 463/29 |
| 2014/0359653 A1* | 12/2014 | Thorpe | .................. | G06F 21/36 |
| | | | | 725/30 |
| 2015/0349966 A1* | 12/2015 | Dimitrakos | ........... | H04W 12/06 |
| | | | | 713/168 |
| 2016/0098932 A1* | 4/2016 | Wachowiak | ............. | G09B 5/06 |
| | | | | 434/236 |
| 2016/0125748 A1* | 5/2016 | Ashford | .................. | G09B 5/00 |
| | | | | 434/236 |
| 2018/0263496 A1* | 9/2018 | Jiang | .................... | A61B 5/4064 |

* cited by examiner

MEMORY PUZZLE SYSTEM

CROSS-REFERENCE TO RELATED APPLICATIONS

This application claims under 35 U.S.C. § 119(e) to U.S. Provisional Application No. 62/644,293, entitled "SYSTEM AND A GAME TO HELP IMPROVE MEMORY RETENTION, AND INCREASING ATTENTION SPAN OF PLAYERS" and filed on Mar. 16, 2018, which is hereby incorporated by reference herein in its entirety.

BACKGROUND OF THE INVENTION

The ability to retain and recall information is vital to an individual's development. For example, an individual can learn from past experiences to guide future actions. However, environmental or mental distractions can affect an individual's memory and ultimately the individual's development. For example, such distractions can result in poor performance at school, low productivity at work, inefficiency in the execution of everyday tasks, and/or the like.

SUMMARY

Systems and methods for generating a memory puzzle are provided. In one aspect, a memory puzzle system receives a selection of puzzle parameters via a first user interface. The memory puzzle system can obtain a plurality of media files associated with the puzzle parameters, and determine an order in which to play the plurality of media files. The memory puzzle system can also generate user interface data that, when rendered, causes a client system to display a second user interface that plays the plurality of media files in the determined order. The memory puzzle system can obtain thumbnails associated with the plurality of media files that are displayed in the second user interface after playback of the plurality of media files is complete, and the thumbnails can be displayed in the second user interface as part of a quiz to determine whether an individual accurately memorized an order in which the media files were played. The memory puzzle system can receive an ordered selection of the thumbnails, and generate a score based at least partly on the ordered selection of the thumbnails.

One aspect of the disclosure provides a system that comprises a non-transitory computer-readable storage medium storing computer-executable instructions. The system further comprises one or more hardware processors in communication with the computer-readable memory, wherein the executable instructions, when executed by the one or more hardware processors, cause the one or more hardware processors to at least: process a selection of one or more puzzle parameters; obtain one or more media files associated with the one or more parameters; determine an order in which to play the one or more media files; cause a user interface to play the one or more media files in the determined order; obtain a plurality of thumbnails associated with the one or more media files, wherein the plurality of thumbnails are displayed in the user interface in a second order different than the determined order after playback of the one or more media files is complete; process an ordered selection of the plurality of thumbnails received via the user interface; and generate a score based at least partly on the ordered selection of the thumbnails.

The system of the preceding paragraph can include any sub-combination of the following features: where the executable instructions, when executed, further cause the one or more hardware processors to at least: assign the one or more media files to a first user, and transmit the one or more media files to a user device associated with the first user; where the one or more puzzle parameters comprises at least one of a puzzle type, a puzzle difficulty, or a puzzle length; where the puzzle difficulty comprises one of an easy difficulty level, an intermediate difficulty level, or a hard difficulty level; where the one or more media files comprise at least one of an image file, a video file, an audio file, or an animation; where the executable instructions, when executed, further cause the one or more hardware processors to at least determine randomly the order in which to play the one or more media files; where the determined order of the one or more media files is based at least partly on the one or more puzzle parameters; where a first thumbnail in the plurality of thumbnails is associated with a first media file in the one or more media files, and wherein the executable instructions, when executed, further cause the one or more hardware processors to at least: instruct a user device displaying the user interface to capture images of a user, process the images to determine an instance in which a gaze of the user is in a direction other than a direction of a screen of the user device, and generate the first thumbnail to include a frame of the first media file played at a time corresponding to the instance in which the gaze of the user is in the direction other than the direction of the screen of the user device; where a first thumbnail in the plurality of thumbnails is a frame of a first media file in the one or more media files; and where a first thumbnail in the plurality of thumbnails is associated with a first media file in the one or more media files, and wherein the first thumbnail is an image that does not originate from the first media file.

Another aspect of the disclosure provides a computer-implemented method comprising: receiving a selection of one or more puzzle parameters; obtaining one or more media files associated with the one or more parameters; determining an order in which to play order of the one or more media files; causing a user interface to play the one or more media files in the determined order; obtaining a plurality of thumbnails associated with the one or more media files, wherein the plurality of thumbnails are displayed in the user interface in a second order different than the determined order after playback of the one or more media files is complete; receiving an ordered selection of the plurality of thumbnails via the user interface; and generating a score based at least partly on the ordered selection of the thumbnails.

The computer-implemented method of the preceding paragraph can include any sub-combination of the following features: where the computer-implemented method further comprises: assigning the one or more media files to a first user, and transmitting the one or more media files to a user device associated with the first user; where the one or more puzzle parameters comprises at least one of a puzzle type, a puzzle difficulty, or a puzzle length; where the puzzle difficulty comprises one of an easy difficulty level, an intermediate difficulty level, or a hard difficulty level; where the one or more media files comprise at least one of an image file, a video file, an audio file, or an animation; where determining an order in which to play order of the one or more media files further comprises determining randomly the order in which to play the one or more media files; where a first thumbnail in the plurality of thumbnails is associated with a first media file in the one or more media files, and wherein the computer-implemented method further comprises: instructing a user device displaying the user interface to capture images of a user, processing the images to determine an instance in which a gaze of the user is in a direction other than a direction of a screen of the user device, and generating the first thumbnail to include a frame of the first media file played at a time corresponding to the instance in which the gaze of the user is in the direction other than the direction of the screen of the user device; where a first thumbnail in the plurality of thumbnails is a frame of a first media file in the one or more media files; and where a first thumbnail in the plurality of thumbnails is associated with a first media file in the one or more media files, and wherein the first thumbnail is an image that does not originate from the first media file.

Another aspect of the disclosure provides non-transitory, computer-readable storage media comprising computer-executable instructions, wherein the computer-executable instructions, when executed by a computer system, cause the computer system to: process a selection of one or more puzzle parameters; obtain one or more media files associated with the one or more parameters; determine an order in which to play the one or more media files; cause a user interface to play the one or more media files in the determined order; obtain a plurality of thumbnails associated with the one or more media files, wherein the plurality of thumbnails are displayed in the user interface in a second order after playback of the one or more media files is complete; process an ordered selection of the plurality of thumbnails received via the user interface; and generate a score based at least partly on the ordered selection of the thumbnails.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
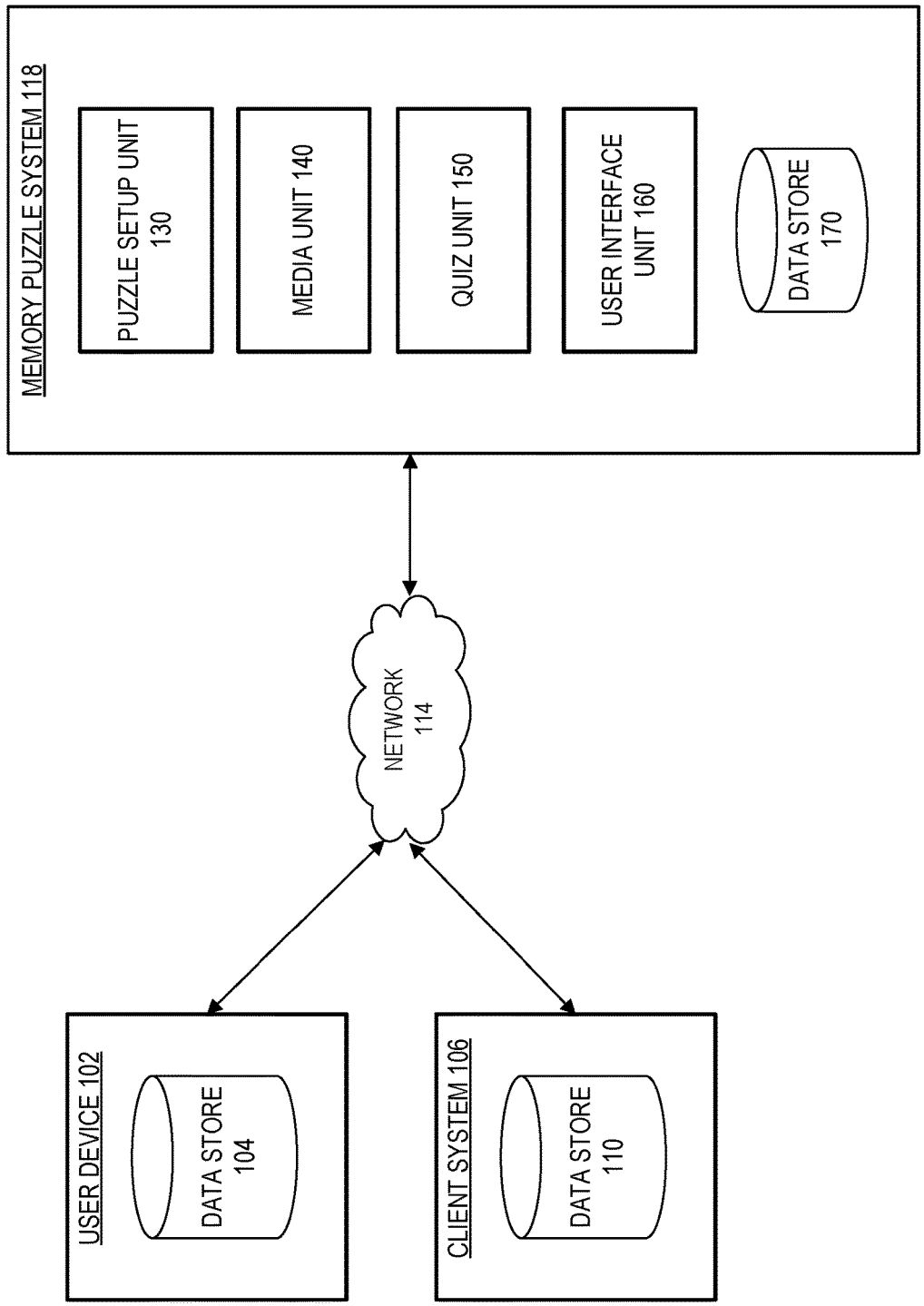
FIG. 1 is a block diagram illustrating an example computing environment for a memory puzzle system, according to some embodiments.

As described above, environmental or mental distractions can impair an individual's ability to retain and recall information. For example, an individual may score poorly on a reading comprehension test. The reason for the poor test results may not have to do with the individual's reading comprehension, but rather with the individual's memory. Often, individuals can be distracted by their environment or their own thoughts, and lose track of the story being read. Thus, exercises that nurture and develop an individual's memory retention despite the presence of one or more distractions can improve the individual's performance at school, productivity at work, execution of everyday tasks, and/or the like.

For years, educators have used traditional exercises, such as flash cards or other in-person memory retention games (e.g., board games), to strengthen memory retention. For example, a flashcard may include a word or phrase on one side of the flashcard and a picture associated with the word or phrase on the other side of the flashcard. An individual can review each side of a flashcard to create a mental association of the word or phrase and the picture, and an educator can test the individual's memory retention by showing the picture and asking the individual to write or speak the word or phrase associated with the picture. An educator may utilize multiple flashcards in an attempt to improve an individual's memory.

Flashcards and other in-person memory retention games, however, have several drawbacks. For example, flashcards and other in-person memory retention games do not provide any ability to simulate environmental or mental distractions. The lack of simulated distractions can result in a failure to adequately train an individual to retain information because the presence of distractions can force an individual to focus on the information to be retained. Thus, any test results obtained from the use of flashcards or physical memory retention games may present an unrealistic assessment of an individual's memory retention.

As another example, flashcards and other in-person memory retention games are typically produced on a written medium having a limited size. Given the physical size constraints and the type of medium on which the flashcards and other-in person memory retention games are produced, such in-person memory retention games usually include a single word or phrase and a static image. The type of information that an individual can learn and retain from such in-person memory retention games is therefore limited. In particular, in-person memory retention games can be used, to some extent, to help an individual associate a word or phrase with a static image. However, in-person memory retention games provide no mechanism to help an individual associate a word or phrase (or any other information) with an action, a movement, a sound, and/or the like. As an illustrative example, in-person memory retention games cannot practically be used to teach an individual the movements made by an object having a specific name, the sounds made by an object having a specific name, how to perform a task or learn a sequence of steps in which various actions are to be performed in a specific order (e.g., a sequential task, such as assembling a piece of furniture, preparing a meal, knitting an article of clothing, learning the life cycle of a butterfly, or other tasks that relate to a particular discipline and/or are educational in nature) and/or the like.

As another example, in-person memory retention games provide no mechanism for an educator to verify that an individual is associating a word or phrase with an object depicted in an image rather than the image itself. For example, some individuals may simply memorize an association between a word or phrase and an image depicted on a flashcard, but not understand that the word or phrase is describing or defining the underlying object depicted in the image. If the individual is then presented with a different image of the object, the individual may not associate the previously learned word or phrase with the new image. Thus, the in-person memory retention game may ultimately be ineffective.

Finally, in-person memory retention games lack features that allow an educator to determine whether an individual is paying attention or otherwise engaged with the learning process. For example, an individual may repeatedly perform poorly when engaging in the in-person memory retention game. An educator, however, may not be able to easily determine why the individual's performance is poor or how the individual's performance can be improved.

In fact, simply automating an in-person memory retention game or converting the game into an electronic form would not cure the deficiencies of in-person memory retention games described herein. For example, generating a network page (e.g., content page, web page, etc.) available to a user computing device over a network that displays content otherwise depicted on a flashcard would not be sufficient to introduce simulated environmental or mental distractions; to teach an individual to associate a word or phrase (or any other information) with an action, a movement, a sound, etc.; to verify that an individual learns a connection between a word or phrase and an object depicted in an image; and/or to track whether an individual is paying attention while engaging with the game.

In addition, the user interactions with the network pages that may occur as a result of converting an in-person memory retention game into an electronic form can be overwhelming. For example, if an educator attempts to create a memory retention game to teach an individual how to perform a task that involves multiple steps and each step is depicted on a network page, the educator or an individual attempting to learn how to perform the task may have to find and navigate to multiple different network pages to view the various steps. Given that there can be a nearly infinite number of possible combinations of steps and/or tasks that an individual may attempt to learn, the navigation, scrolling, and/or other user interactions with the network pages that would have to be performed to identify and view the steps of a task would be extremely time-intensive. The navigational burdens may be present with network pages that simply depict the content that is otherwise depicted on flashcards given that there can be a nearly infinite amount of possible content that an individual can learn to associate with words or phrases.

Accordingly, described herein is a memory puzzle system that allows any user (e.g., an educator, an instructor, a supervisor, a trainer, therapist, parent, etc.) to improve the memory retention abilities of an individual. For example, the memory puzzle system can improve an individual's associate memory and/or improve an individual's ability to learn how to perform a sequence of steps and/or the order (e.g., temporal order) in which the steps are to be performed. The memory puzzle system implements operations that previously could not be performed manually or using a computing system at least for the reasons described above.

For example, to improve an individual's associate memory and/or an individual's ability to learn how to perform a sequence of steps and/or the order in which the steps are to be performed, the memory puzzle system can provide a user interface that allows a user to design a memory puzzle (e.g., a game). A memory puzzle designed to improve an individual's associate memory can include a series of one or more media files presented to the individual in a random order in a user interface. The objective of the memory puzzle may be for the individual (e.g., a player) to remember the order or sequence in which the media files were played or displayed. The individual may think of an existing story or mentally make up a story, and associate the story with the played or displayed media files to remember the sequence in which the media files are played or displayed. Once playback of the media file(s) is complete, the memory puzzle system can cause a user interface to display a quiz that includes a thumbnail corresponding to each of the media file(s). The thumbnails can be displayed in a random order (e.g., a randomly selected order that may or may not be the order in which the media file(s) are played), and the individual may be prompted to select each thumbnail in the order in which the corresponding media file(s) were played. As described in greater detail below, the thumbnails presented to the individual may or may not have previously been presented to the individual when playback of the media file(s) was occurring. In addition, some or all of the media file(s) may include unrelated noises, sounds, and/or images in an attempt to distract the individual and force the individual to focus on the primary content of the media file(s) and the order in which the file(s) are played. If the individual correctly selects the thumbnails in the order in which the corresponding media file(s) were played, the memory puzzle system can cause the user interface to automatically replay the media file(s) of the memory puzzle in a new random order and/or to increase the difficulty of the memory puzzle and prompt the individual to replay the puzzle with the increased difficulty (e.g., the memory puzzle system can cause the user interface to play the original media file(s) and one or more new media file(s), optionally in a new random order; play shortened versions of the media file(s), optionally in a new random order; etc.). Otherwise, if the individual selects the thumbnails in an incorrect order, the memory puzzle system can cause the user interface to automatically replay the media file(s), optionally in a new random order.

Similarly, a memory puzzle designed to improve an individual's ability to learn how to perform a sequence of steps of a task and/or the order in which the steps are to be performed can include a series of one or more media file(s) presented to the individual in a specific order in a user interface. The objective of the memory puzzle may be for the individual (e.g., a player) to remember the order or sequence in which the media files were played or displayed. The individual may think of an existing story or mentally make up a story, and associate the story with the played or displayed media files to remember the sequence in which the media files are played or displayed. Once playback of the media file(s) is complete, the memory puzzle system can cause a user interface to display a quiz that includes a thumbnail corresponding to each of the media file(s). The thumbnails can be displayed in a random order (e.g., a randomly selected order that may or may not be the order in which the media file(s) are played), and the individual may be prompted to select each thumbnail in the order in which the corresponding media file(s) were played. The memory puzzle system can then cause the user interface to display specific content depending on whether the individual selects the thumbnails in the correct or incorrect order in a manner as described above with respect to an associative memory puzzle.

The memory puzzle system can further access one or more components of an individual's device or one or more components coupled to an individual's device (e.g., a camera, a motion sensor, a microphone, a light source, a touch sensor, a sound sensor, etc.) to track whether an individual is paying attention to a memory puzzle and, if not, a reason why the individual is not paying attention. Upon detecting that an individual is not paying attention to the memory puzzle, the memory puzzle system can produce a sound, transmit a notification to the individual's device and/or another user's device, enable and/or flash a light source of the individual's device, change a color of the user interface depicting the memory puzzle, pause playback of the video and/or audio clips of the memory puzzle, and/or the like in an attempt to capture the individual's attention.

Thus, the memory puzzle system can provide several technical benefits over in-person memory retention games that are simply converted into electronic form and can achieve results that were previously impossible using typical in-person memory retention games. For example, the memory puzzle system can simulate distractions to focus an individual's attention on the content being depicted; include content that depicts movement, sounds, etc. so that an individual can associate a word or phrase (or any other information) with more than just a static image; prompt an individual to select the order in which media file(s) were played using thumbnails that may or may not have initially been displayed during playback of the media file(s) to verify whether the individual actually learned a connection between a word or phrase and an object depicted or pronounced in a media file; and/or track whether an individual is paying attention while engaging with the memory puzzle and, if not, take corrective action. In addition or alternatively to the distractions simulated by the memory puzzle system, ambient distractions (e.g., sounds, noises, etc. present in the environment) may be present during playback of the memory puzzle.

The present disclosure describes the thumbnails as being images. However, this is not meant to be limiting. For example, instead of being images, the thumbnails can be text, symbols, playable audio clips, playable video clips, and/or other type of content, where the content corresponds to the media file(s) that were played.

FIG. 1 is a block diagram illustrating an example computing environment for a memory puzzle system 118. The illustrative environment includes a user device 102, client system 106, a network 114, and the memory puzzle system 118. In some embodiments, user device 102 and client system 106 may be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and/or the like. In some embodiments, a user device 102 may be a computing device utilized by a student or individual (e.g., a child, a teenager, an adult, etc.) that is attempting to improve memory retention, while the client system 106 may be a computing system associated with a user helping the student or individual improve memory retention (e.g., an educator (e.g., a teacher), an instructor, a supervisor, a trainer, a therapist, a parent, etc.).

The memory puzzle system 118 may be configured to generate a memory puzzle in response to a user request. For example, the memory puzzle can be an associate memory puzzle designed to improve an individual's associate memory. Alternatively, the memory puzzle can be a sequential task memory puzzle designed to improve an individual's ability to learn how to perform a sequential task (e.g., how to perform a sequence of steps of a task and/or the order in which the steps are to be performed).

The associate memory puzzle can include a series of one or more media files presented to an individual in a random order in a user interface displayed on a user device 102. Each media file can be related to the other media files in the series, or some or all of the media files can be unrelated to the other media files in the series. As described herein, user interface unit 160 can generate and transmit user interface data to the user device 102, where the user interface data, when processed, causes the user device 102 to render and/or display the user interface. The media file(s) may begin to play once the user initiates the memory puzzle. Once playback of the media file(s) is complete, the displayed user interface may update to display a thumbnail corresponding to each of the media file(s). The thumbnails can be displayed in a random order (e.g., a randomly selected order that may or may not be the order in which the media file(s) are played), and the individual may be prompted to select each thumbnail in the order in which the corresponding media file(s) were played. If the individual correctly selects the thumbnails in the order in which the corresponding media file(s) were played, the displayed user interface may automatically replay the media file(s) of the memory puzzle in a new random order and/or may increase the difficulty of the memory puzzle and prompt the individual to replay the puzzle with the increased difficulty. The difficulty level of a memory puzzle can be increased by incrementing the number of media files that are played during the puzzle and/or by reducing the length of each individual media file that is played during the puzzle. Otherwise, if the individual selects the thumbnails in an incorrect order, the displayed user interface may automatically replay the media file(s), optionally in a new random order.

Similarly, the sequential task memory puzzle can include a series of one or more media file(s) presented to the individual in a specific order in a user interface displayed on a user device 102. Each media file may correspond to a specific step of a task. As described herein, user interface unit 160 can generate and transmit user interface data to the user device 102, where the user interface data, when processed, causes the user device 102 to render and/or display the user interface. The media file(s) may begin to play once the user initiates the memory puzzle. Once playback of the media file(s) is complete, the displayed user interface may update to display a thumbnail corresponding to each of the media file(s). The thumbnails can be displayed in a random order (e.g., a randomly selected order that may or may not be the order in which the media file(s) are played), and the individual may be prompted to select each thumbnail in the order in which the corresponding media file(s) were played. The displayed user interface may update to display specific content depending on whether the individual selects the thumbnails in the correct or incorrect order in a manner as described above with respect to an associative memory puzzle.

As described herein, a media file can include one or more video files, one or more audio files, one or more images, one or more animations, and/or the like. For example, a media file can include a video file appended to an image such that playback of the media file involves playback of the video file followed by the display of the image for a period of time. As another example, a media file can include an audio file appended to a video file such that playback of the media file involves playback of the audio file followed by playback of the video file.

A video file included within a media file may or may not have audio (e.g., may or may not be a silent clip). In some embodiments in which a video file includes audio, the audio corresponds to the content of the video file. As an illustrative example, if the content of the video file is a horse, the audio may include horse sounds or a person speaking the word "horse." In other embodiments in which a video file includes audio, the audio may be unrelated to the content of the video file. As an illustrative example, if the content of the video file is a horse, the audio may include car sounds or a person speaking the word "plane." In this embodiment, the audio may be simulating a distraction in an attempt to force an individual to focus on the content of the video file. Optionally, such as in easier difficulty levels, one or more video files may incorporate a story to make it easier for the individual to memorize the order in which media files are played.

Conversely, an audio file included within a media file may or may not have corresponding visuals. In some embodiments in which an audio file includes a visual (e.g., an image or a video), the visual corresponds to the content of the audio file. As an illustrative example, if the content of the audio file is a person speaking the word "horse," the visual may depict a horse. In other embodiments in which an audio file includes a visual, the visual may be unrelated to the content of the audio file. As an illustrative example, if the content of the audio file is a person speaking the word "horse," the visual may depict a plane. In this embodiment, the visual may be simulating a distraction in an attempt to force an individual to focus on the content of the audio file. Optionally, such as in easier difficulty levels, one or more audio files may incorporate a story to make it easier for the individual to memorize the order in which media files are played. In addition, one or more audio files may have associated images or pictures that may be displayed as tiles for the audio file(s) during media file playback that may be arranged by the individual sequentially to represent the sequence of the audio file(s).

An animation may include a sequence of frames that repeat one or more times during playback of the corresponding media file. Alternatively or in addition, an animation may include an operation performed on a static image, such as a zoom in or zoom out operation. As an illustrative example, the animation may initially depict a crowded scene that includes people, buses, a traffic light, and restaurants. Playback of the animation may result in the static image being enlarged such that the traffic light is the primary or only object depicted therein, thereby revealing the content associated with the media file. Optionally during the enlargement, certain portions of the static image can be greyed out or set to a higher transparency level, while other portions of the static image can highlighted via the outline of a shape (e.g., a rectangle, an oval, a circle, etc.). Alternatively or in addition, the animation may initially depict a first image. After a period of time has passed, the animation may depict a second image, optionally concurrently with the first image. After another period of time has passed, the animation may depict a third image, optionally concurrently with the first and/or second images, and so on. Each new image may correspond to the same type of item, but depict the item from a different angle, depict a different number of the items, depict the item at a different size, etc.

In some embodiments, the memory puzzle system 118 may be accessible via a network, such as the network 114, and may allow users to register and create user profiles. For example, a user operating a client system 106 may have an instructor user profile which may allow the user to generate and select memory puzzles, while a student or individual operating a user device 102 may be associated with a student user profile that does not allow the student to generate or assign their own puzzles. Rather, the user may assign one or more memory puzzles to a student user profile, and the student or individual can then access and play the assigned memory puzzle(s) via the student user profile. An instructor user profile can include the students or individuals who may play memory puzzles as facilitated by the instructor or user, and information and/or results about memory puzzles played by the students or individuals. A student profile can include a name, gender, age, location, etc. of the student. In addition, the student profile may include data indicating the memory puzzles that the student or individual has played, and the results of playing the memory puzzles.

While FIG. 1 illustrates a single user device 102 and a single client system 106, this is not meant to be limiting. Any number of user devices 102 and client systems 106 may each be used by any number of different users (e.g., individuals, students, educators, instructors, etc.) to access and/or to interact with the memory puzzle system 118. In some embodiments, the user device 102 and client system 106 may each receive one or more files from the memory puzzle system 118 over network 114 and store the received files in data store 104 and data store 110 respectively. For example, the client system 106 may receive a custom media file from the memory puzzle system 118 for local playback on the client system 106. Thus, the content of some or all of a memory puzzle can be stored and played locally on a user device 102 and/or a client system 106.

In some embodiments, memory puzzle system 118 may include a puzzle setup unit 130, a media unit 140, a quiz unit 150, a user interface unit 160, and a data store 170. The data store 170 may store a plurality of media files, such as video files prepared by an educator or instructor. Alternatively or in addition, media files may include audio files, static images, animations, and/or other types of media. For example, the data store 170 may be a database, where each database entry is a media file associated with one or more words, phrases, themes, subjects, sentences, topics, objects, items, tasks, steps in a task, and/or other types of categories. Each entry in the database may be associated with metadata identifying a title, a duration, one or more sounds, one or more categories, an address, description, tag, pointer, and/or numerical value of the corresponding media file. For example, a media file may be associated with the numerical value "5" to indicate that the media file corresponds to an enumerated category.

The puzzle setup unit 130 may receive, through a search tool, a search query for specific images, video clips, audio clips, animations, and/or other types of content to include in a memory puzzle. As will be discussed later, in some embodiments, the search tool may be a search box displayed in a user interface and may allow a user to search for specific media clips based on factors like subject matter and duration.

The memory puzzle system 118 may utilize puzzle setup unit 130 to determine the parameters of a memory puzzle. As will be discussed later, the user interface unit 160 may generate user interface data that, when rendered by a client system 106, causes the client system 106 to display a user interface that a user may interact with to form a memory puzzle. The puzzle setup unit 130 may track a user's selection of puzzle parameters (e.g., a type, a difficulty, and a length) and/or categories (e.g., where each category corresponds to a characteristic of the memory puzzle) in the user interface.

The memory puzzle system 118 may utilize media unit 140 to group media files based at least partly on the user selection received via puzzle setup unit 130. In some embodiments, media unit 140 may select and group a number of media files stored in data store 170. In some embodiments, the media unit 140 may automatically group a plurality of media files into a logical group based at least partly on the user selection. For example, a user may select a theme (e.g., colors, a holiday, animals at the zoo, a season, a place or location, etc.) for a memory puzzle from a list of themes via a user interface displayed on the client system 106 based on user interface data generated by the user interface unit 160, and the media unit 140 may use the user selection to group together media files associated with the selected theme. While a media file may comprise one or more video files in some embodiments, it will be appreciated that in other embodiments, a media file may include one or more static images, one or more animations, and/or one or more audio files associated with the user-selected theme or other category instead of or in addition to the video file(s). In some embodiments, the number of media files selected by the media unit 140 may be based at least partly on the user-selected puzzle parameters. For example, as described herein, a user may select a specific puzzle length (e.g., 3 units, where each unit corresponds to a distinct media file), and the media unit 140 may therefore select and group only three distinct media files from the plurality of media files.

The type of media files selected by the media unit 140 may also be based at least partly on the user-selected puzzle parameters. For example, a user may select a specific difficulty level for the memory puzzle. If the user selects an "easy" difficulty level, the types of media files selected by the media unit 140 may have a longer duration (e.g., 10 seconds, 15 seconds, 20 seconds, 30 seconds, etc.). On the other hand, if the user selects a "hard" difficulty level, the types of media files selected by the media unit 140 may have a shorter duration (e.g., 1 second, 3 seconds, 5 seconds, etc.).

For a memory puzzle corresponding to a particular theme and having a specific puzzle length, the "easy" and "difficult" versions of the memory puzzle may each include media files directed to the same subject matter. For example, the "easy" version may have a first media file directed to a first subject and a second media file directed to a second subject. Both the first and second media files may have a longer duration. The "difficult" version may have a third media file directed to the first subject and a fourth media file directed to the second subject. Both the third and fourth media files may have a shorter duration. While the first and third media files may be directed to the same subject, the media files may be different. The same may be true for the second and fourth media files. Alternatively, the third media file may be derived from the first media file. For example, the user may select a portion of the first media file to serve as the third media file. As another example, the media unit 140 can use object recognition to identify one or more objects depicted in one or more frames of the first media file, can use a trained artificial intelligence model (e.g., a machine learning model, a neural network, etc., optionally trained using frames annotated to identify what object(s) are present or described therein) that outputs an identification of object(s) depicted or described in a frame given a frame of the first media file as an input, can use speech recognition to identify one or more objects described in one or more frames of the first media file, etc. As described herein, a media file can be associated with metadata identifying, among other things, a title or subject matter of the media file. Thus, the media unit 140 can determine the content of one or more frames of the first media file, and compare the content to the title or subject matter of the first media file. If the content of one or more frames matches or is similar to the title or subject matter of the first media file, the media unit 140 can form the third media file using the frame(s). Thus, the media unit 140 can identify, without user interaction, a portion of the first media file that, if played, is sufficient to retain and recall the subject matter of the first media file and therefore can be used in a "difficult" version of the memory puzzle.

The memory puzzle system 118 may utilize quiz unit 150 to generate a quiz or memory puzzle associated with the user-selected puzzle parameters. The quiz unit 150 can generate multiple versions of a memory puzzle, where different versions may be sequentially presented to an individual as an individual completes a particular version of the memory puzzle. In some embodiments, the quiz unit 150 may randomly determine an order in which the grouped media files are played. For example, if the media unit 140 selected media file 1, media file 2, media file 3, and media file 4 to form the memory puzzle, the quiz unit 150 may randomly determine a playback order in which media file 4 is played first, media file 2 is played second, media file 3 is played third, and media file 1 is played last. In some embodiments, the memory puzzle system 118 (e.g., the quiz unit 150) may concatenate the plurality of media files into one memory puzzle file. The media files that comprise the memory puzzle file may be concatenated such that there is no visual indication (e.g., a visible marker, a frame that says "start" or "end," a different visible color to indicate a different media file, etc.), audible indication (e.g., a sound, a person saying "start" or end," etc.), or touch-based indication (e.g., a vibration) of when one media file ends and a subsequent media file begins. Alternatively, the quiz unit 150 may not concatenate the plurality of media files, but may nonetheless cause the media files to play with no visual, audible, or touch-based indication of when one media file ends and a subsequent media file begins. In other embodiments, the quiz unit 150 can cause a visual, audible, and/or touch-based indication to occur when one media file ends and a subsequent media file begins (whether or not the media files are concatenated).

In some embodiments, the quiz unit 150 causes the media files to be played in a particular sequential order. For example, if a user chooses to design a memory puzzle that tests an individual's ability to learn how to perform a sequence of steps of a task and/or the order in which the steps are to be performed, the media files may each correspond to a particular step of the task. The quiz unit 150 may order the media files such that the steps of the task are illustrated in the order necessary to perform accurately or appropriately the corresponding task.

The quiz unit 150 can determine one or more thumbnails to display as part of the quiz associated with the memory puzzle. For example, the thumbnails may be images displayed in a user interface rendered by a user device 102 once playback of the media file(s) is complete. The thumbnails may be selectable, and the quiz unit 150 may cause the thumbnails to be displayed for the purpose of testing the memory retention of the individual. For example, each thumbnail may correspond to a media clip played during the memory puzzle, and the individual may be prompted to select the thumbnails in the order in which the media clips were played. The quiz unit 150 can randomly select the order in which the thumbnails appear in the user interface. Thus, the order in which the thumbnails appear in the user interface may be the same or different as the order in which the media clips were played.

In some embodiments, the quiz unit 150 selects the thumbnail(s) to be displayed from the one or more media files that form the memory puzzle based on user input. For example, the user interface unit 160 may generate user interface data that, when rendered, causes a client system 106 to display a user interface depicting a list of various media files. A user can select, in the user interface, a media file from the list, which may cause the user interface to display a media player for playback of the media file and a prompt to select a specific frame in the media file to use as a quiz thumbnail. The user can play the media file to identify the frame to use as a quiz thumbnail or can jump to a specific frame of the media file (without actually playing the media file) to use as a quiz thumbnail. Once the desired frame is identified, the user can select, within the user interface, a user interface element (e.g., a button, a drop down menu, etc.) and/or provide a voice command to capture and save the frame as a quiz thumbnail. The quiz unit 150 can receive the quiz thumbnail upon the user selection.

In other embodiments, the quiz unit 150 may automatically select a frame within each media file to use as a thumbnail for the quiz. The quiz unit 150 can automatically select a thumbnail for a media file before creation of the memory puzzle, after creation of the memory puzzle and before an individual plays the memory puzzle, during playback of one or more media files, and/or after playback of one or more media files is complete. For example, the quiz unit 150 can randomly select a first frame of a media file, a last frame of a media file, or any frame in between to serve as a thumbnail for the media file. As another example, the quiz unit 150 can use object recognition, artificial intelligence, speech recognition, and/or the like to select a thumbnail for a media file. As another example, the quiz unit 150 can receive data from one or more components coupled to or embedded within a user device 102, such as camera data, microphone data, motion sensor data, touch sensor data, sound sensor data, etc., captured while a media file is being played as part of a quiz. The user device 102 may capture the data at specific times and may correlate the data with one or more frames of the media file being played while the data was captured. The quiz unit 150 can process the data to determine when an individual was paying attention to the media file during playback and when the individual was not paying attention to the media file during playback. As an illustrative example, the camera data may be an image of the individual. By performing image processing techniques, the quiz unit 150 can determine whether the eyes of the individual were focused on a screen of the user device 102 or looking in another direction. If the eyes of the individual were focused on the screen of the user device 102, the quiz unit 150 may determine that the individual was paying attention to the correlated frame(s) of the media file. Conversely, if the eyes of the individual were focused in a direction other than toward the screen of the user device 102, the quiz unit 150 may determine that the individual was not paying attention to the correlated frame(s) of the media file. To improve an individual's memory retention, the quiz unit 150 may then select as a thumbnail a frame of the media file that was played while the individual was not paying attention.

The present disclosure describes the thumbnail as being a video frame of a media file or an image. However, the thumbnail could alternatively be a playable audio file, a playable video file, text, a symbol, and/or the like.

As described herein, the quiz unit 150 can generate multiple versions of the memory puzzle using puzzle parameters selected by a user. Each version of the memory puzzle may have a different difficulty level, have a different length, and/or include different types of media files. A first version of the puzzle game may be presented to an individual first. Upon completion or failure of the first version of the puzzle game, the individual can then be presented with another version of the puzzle game. For example, upon completion of the puzzle game, the quiz unit 150 can instruct the user interface unit 160 to generate updated user interface data that results in the display of an updated user interface depicting a second, more difficult version of the memory puzzle. However, upon failure of the puzzle game, the quiz unit 150 can instruct the user interface unit 160 to generate updated user interface data that results in the display of an updated user interface depicting the same version of the memory puzzle or a second, easier version of the memory puzzle.

The user interface unit 160 interfaces with user device(s) 102 and/or client system(s) 106, such as by generating and transmitting to the user device(s) 102 and/or the client system(s) 106 data that, when rendered, causes the display of various interactive graphical user interfaces (e.g., user interface data). For example, the user interface data, when processed by a user device 102 or client system 106, may cause the user device 102 or client system 106 to render and/or display various user interfaces that allow a user to select puzzle parameters and/or a puzzle category to build a custom memory puzzle, that allow a user to preview the memory puzzle, that allow a user to assign the custom memory puzzle to specific individuals or groups of individuals, and/or that allow individual(s) to play the custom memory puzzle. As an illustrative example, one graphical user interface resulting from the user interface data may display various selectable puzzle parameters and/or puzzle categories that allow the user to form a custom memory puzzle. The graphical user interface may include user interface elements (e.g., buttons, drop down menus, etc.) that allow the user to select a puzzle category and/or one or more puzzle parameters. Selection of one puzzle category may cause the user interface to display a list of media files associated with the selected puzzle category. The graphical user interface can also include user interface elements (e.g., buttons, text entry fields, etc.) that allow the user to search for puzzle types or categories and/or to adjust the selection of puzzle parameters during the creation of a custom memory puzzle.

As another illustrative example, another graphical user interface resulting from the user interface data may display a first pane or window in which one or more media clips are played. Once playback of the media clip(s) is complete, another pane or window in the user interface may depict one or more thumbnails and one or more boxes in a row. The thumbnails may be selectable, and selection of a thumbnail may cause the thumbnail to appear in a box. The box in which a thumbnail appears may depend on the order in which the thumbnails are selected. For example, the first selected thumbnail may appear in the left-most box, the second selected thumbnail may appear in the second left-most box, and so on. Once some or all of the thumbnails are selected, the user interface may depict a notice indicating whether the thumbnails were selected in the correct or incorrect order.

Further examples and details of the user interfaces displayed on the user device(s) 102 and/or the client system(s) 106 based on processing the user interface data generated by the user interface unit 160 are described below with respect to FIGS. 2-6.

In some embodiments, the network 114 includes any wired network, wireless network, or combination thereof. For example, the network 114 may be a personal area network, local area network, wide area network, over-the-air broadcast network (e.g., for radio or television), cable network, satellite network, cellular telephone network, or combination thereof. As a further example, the network 114 may be a publicly accessible network of linked networks, possibly operated by various distinct parties, such as the Internet. In some embodiments, the network 114 may be a private or semi-private network, such as a corporate or university intranet. The network 114 may include one or more wireless networks, such as a Global System for Mobile Communications (GSM) network, a Code Division Multiple Access (CDMA) network, a Long Term Evolution (LTE) network, or any other type of wireless network. The network 114 can use protocols and components for communicating via the Internet or any of the other aforementioned types of networks. For example, the protocols used by the network 114 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

As described herein, the memory puzzle system 118 may access various components coupled to and/or embedded within a user device 102 while the user device 102 displays a user interface depicting a memory puzzle. For example, the memory puzzle system 118 (e.g., the quiz unit 150) can instruct the user device 102 to capture images of the individual using a camera of the user device 102 while the memory puzzle is being played, to capture sounds using a microphone of the user device 102 while the memory puzzle is being played, to detect the presence (or absence) of an individual using a motion sensor (or touch sensor, which can indicate a presence if a touch is detected, or a sound sensor, which can indicate a presence if a sound is detected) of the user device 102 while the memory puzzle is being played, and/or the like for the purpose of monitoring the individual to determine whether the individual is paying attention while the memory puzzle is being played. The user device 102 can process the data locally to determine whether an individual is paying attention and transmit results to the quiz unit 150 or can transmit the data to the quiz unit 150 and the quiz unit 150 can process the data to make the determination. The data may be associated with a frame or set of frames of a media file that were being played when the data was captured.

In particular, the user device 102 and/or the quiz unit 150 can process an image captured using the camera using image processing techniques to determine the direction or gaze of the individual's eyes (e.g., whether the individual is looking at the screen of the user device 102, whether the individual is looking in a direction other than at the screen of the user device 102, whether the individual's eyes are open or closed, etc.). Alternatively or in addition, the user device 102 and/or the quiz unit 150 can process audio data captured by the microphone to determine whether any sounds are detected, such as breathing of an individual, the rubbing of fingers on the user device 102, etc., which can indicate that the individual is present (and therefore paying attention). Lack of any detected sounds may indicate that the individual is not present and therefore not paying attention to the memory puzzle. Alternatively or in addition, the user device 102 and/or the quiz unit 150 can process motion data captured by the motion sensor to determine whether motion is detected (or touch data captured by the touch sensor to determine whether a touch is detected, or sound data captured by the sound sensor to determine whether a sound is detected), which can indicate that the individual is present (and therefore paying attention). Lack of any detected motion may indicate that the individual is not present and therefore not paying attention to the memory puzzle.

The memory puzzle system 118 can use the determination of whether an individual is paying attention to the memory puzzle to perform one or more corrective actions, to select thumbnails, to determine which memory puzzle to play in the future, and/or the like. For example, if a determination is made that the individual was not paying attention for at least a threshold percentage of the memory puzzle (e.g., 10%, 20%, 50%, 80%, etc.), the quiz unit 150 can instruct the user device 102 to produce a sound and/or to vibrate in an attempt to capture the individual's attention, can instruct the user device 102 to enable and/or flash a light source of the user device 102 in an attempt to capture the individual's attention, can instruct the user device 102 or cause the user interface unit 160 to change a color of the user interface depicting the memory puzzle in an attempt to capture the individual's attention, can transmit a notification to the user device 102 requesting the individual to pay attention, can transmit a notification to client system 106 to inform the user that the individual is not paying attention, can instruct the user device 102 to pause playback of the media files, can instruct the user device 102 to repeat or replay the same memory puzzle, can instruct the user device 102 to play an alternative memory puzzle, etc. As another example, the quiz unit 150 can use, as a thumbnail, a frame that was played when the individual was not paying attention. Conversely, if a determination is made that the individual was paying attention for at least a threshold percentage of the memory puzzle (e.g., 10%, 20%, 50%, 80%, etc.), the quiz unit 150 can instruct the user interface unit 160 to generate updated user interface data corresponding to an updated user interface that depicts a more difficult memory puzzle, a longer memory puzzle, and/or the like.

Figure 2:
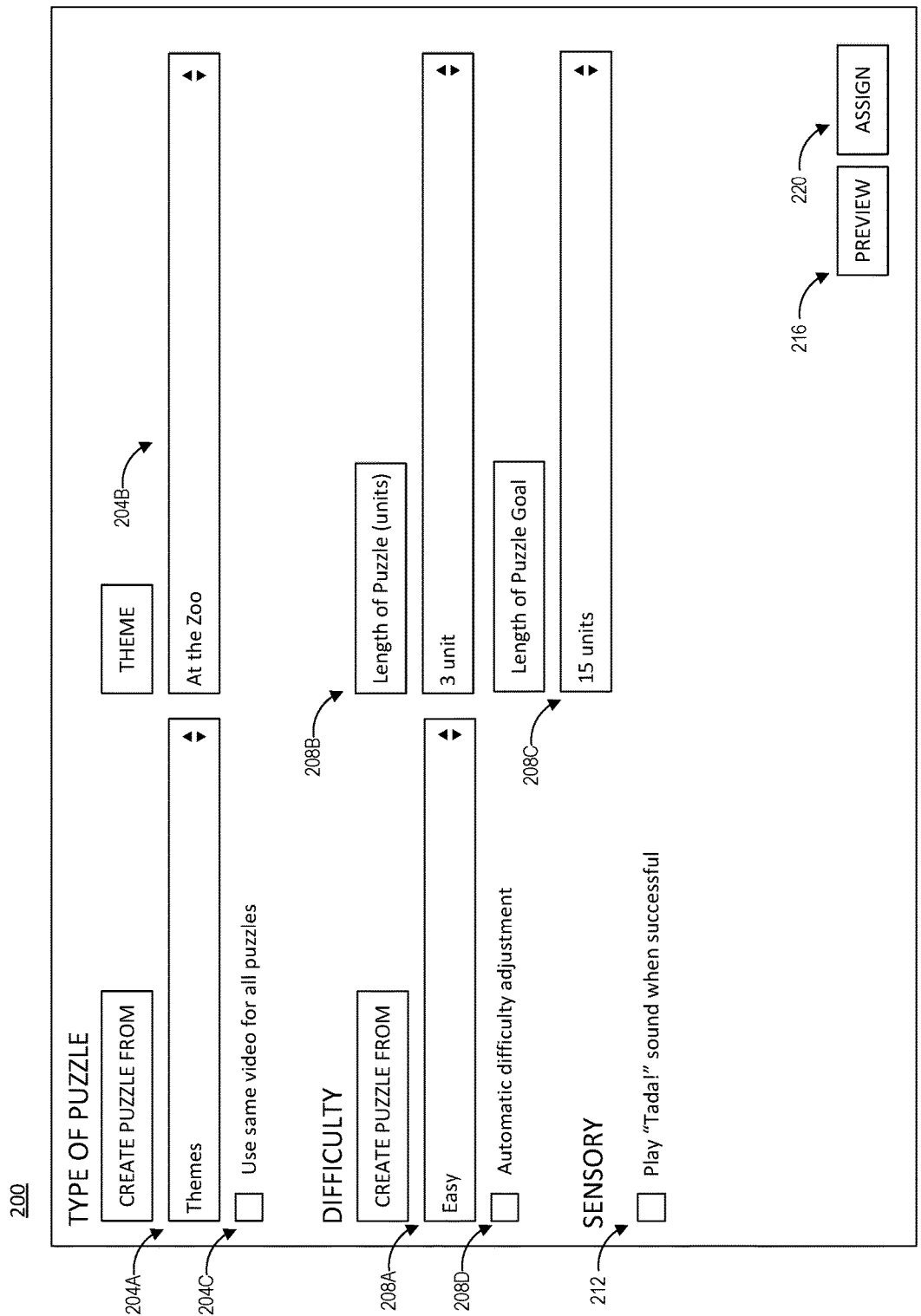
FIGS. 2-3 illustrate example user interfaces that are displayed based on user interface data generated by the memory puzzle system of FIG. 1 and that are configured to allow a user to set up a memory puzzle, according to some embodiments.
Figure 3:
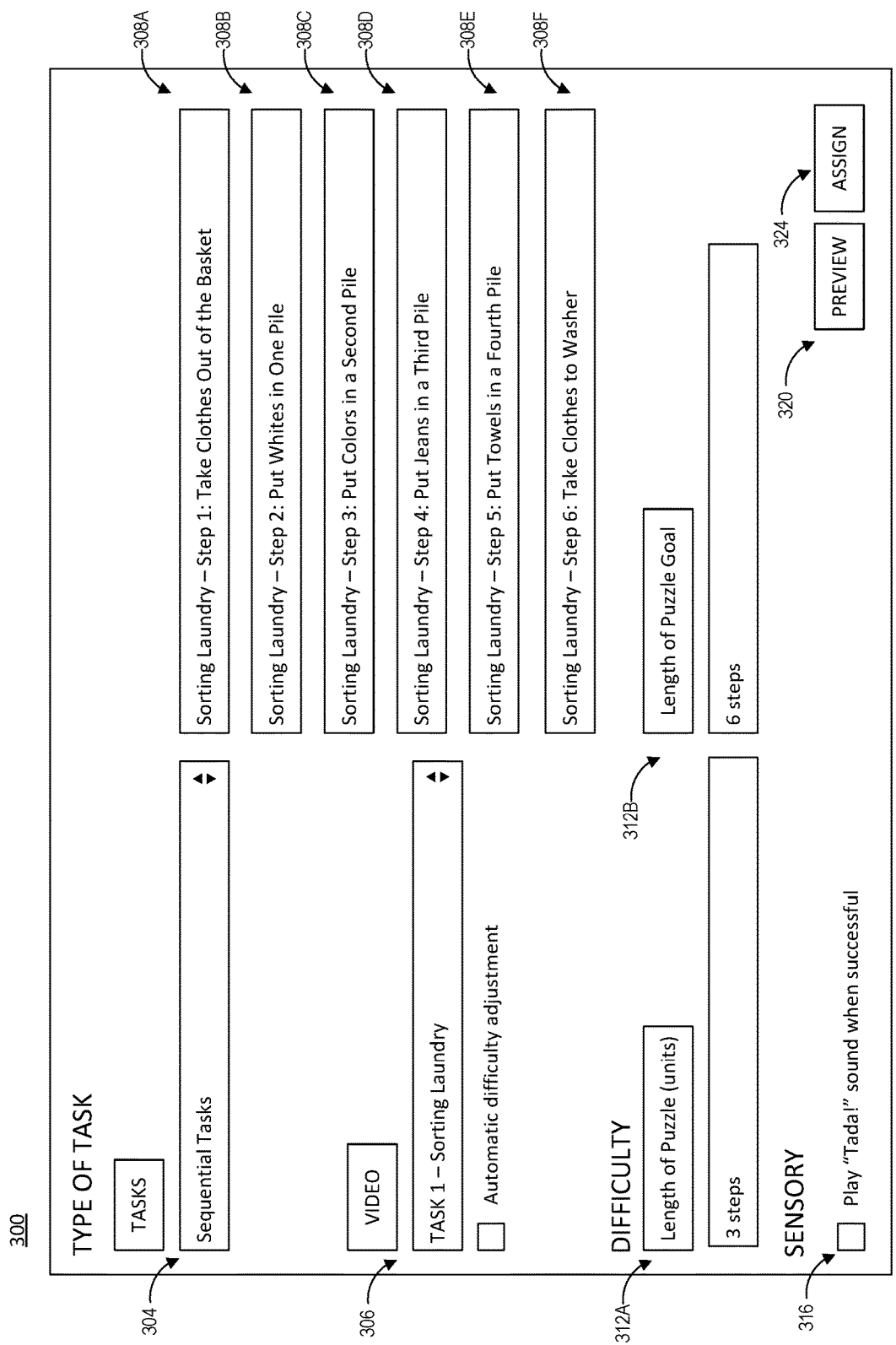

FIGS. 2-3 illustrate example user interfaces that are displayed based on user interface data generated by the memory puzzle system 118 (e.g., the user interface unit 160) of FIG. 1 and that are configured to allow a user to set up a memory puzzle, according to some embodiments. FIG. 2 in particular illustrates an example user interface 200 that a user (e.g., an educator, instructor, supervisor, trainer, therapist, parent, etc.) may interact with to generate an associative memory puzzle. The user interface 200 may be displayed on a client system 106 operated by the user. For example, the user interface unit 160 can generate and transmit user interface data to the client system 106 in response to the user attempting to form or access an associative memory puzzle. The client system 106 can process the user interface data, which causes the client system 106 to display the user interface 200.

The user interface 200 includes puzzle parameters 204A-204C 208A-208D, and 212. Puzzle parameter 204A allows the user to select whether the memory puzzle should correspond to a theme or to no theme. If the user makes a selection indicating that the memory puzzle should correspond to a theme, the user can select the theme via puzzle parameter 204B. Example themes can include a particular holiday, a season, animals at the zoo, colors, a place or location, and/or the like.

Selection of the puzzle parameter 204C may cause the quiz unit 150 to create each version of the memory puzzle with at least one set of common media files. For example, once the user has created a memory puzzle and assigned the memory puzzle to an individual, the individual can play the memory puzzle. Initially, the individual may be presented with a first version of the memory puzzle having a certain length (e.g., the first version may play a certain number of media files). After completion of the first version of the memory puzzle, the individual can be presented with the same memory puzzle or one or more additional versions of the memory puzzle. For example, if the individual selects the thumbnails in the correct order, the individual may be presented with a second version of the memory puzzle. The second version of the memory puzzle may be the same as the first version, but the order in which the media files are played may be different. Alternatively or in addition, the second version of the memory puzzle may be more difficult than the first version of the memory puzzle. For example, the second version of the memory puzzle may have a longer length (e.g., include one or more additional media files), may have media files with shorter durations (e.g., a media file in the first version may have a 20 second duration, but a media file in the second version may have a 5 second duration), and/or the like. This pattern may repeat until the individual selects the thumbnails in the correct order for a version of the memory puzzle having a length equal to the puzzle goal length (described below). If the puzzle parameter 204C is selected, the media file(s) played in the first version of the memory puzzle may also be played in subsequent versions of the memory puzzle (optionally in addition to other media files).

Furthermore, if the puzzle parameter 204C is selected, the user interface 200 may present the user with an option (not shown) to scramble the memory puzzle order in some or all versions of the memory puzzle. For example, if the scramble memory puzzle order parameter is selected, the first version of the memory puzzle may play the set of media files in a first random order, the second version of the memory puzzle may play the set of media files in a second random order (optionally with one or more other media files being played before or after any media file in the set), and so on. Otherwise, if the scramble memory puzzle order parameter is not selected, each version of the memory puzzle may play the set of media files in the same order. If the puzzle parameter 204C is not selected, then each version of the memory puzzle can include playback of the same or different set of media files in any order.

A user may also select a difficulty level of the memory puzzle using puzzle parameter 208A. For example, the user can select an "easy," "intermediate," or "hard" difficulty level. In some embodiments, the difficulty level selected using puzzle parameter 208A may determine the amount of time individual media files of a particular memory puzzle are displayed, the type of media files that are displayed, a display order of the media files, a display order of thumbnails, the type of thumbnails that are displayed, a number of times a media file is repeated during the display of the memory puzzle, etc. In some embodiments, the difficulty level may also determine whether various distractions are included in a memory puzzle game. For example, on a "hard" difficulty setting, a memory puzzle may include ambient noise (e.g., static noise), audio unrelated to the displayed video (e.g., a bird chirping even though the video displays a cow), or sudden visual cues (e.g., a random image) that may distract the individual from the substance or primary focus of the media file. However, on an "easy" difficulty setting, the memory puzzle may not include such distractions. Nonetheless, if the "easy" difficulty setting is selected and the individual eventually selects the thumbnails of one version of the memory puzzle in a correct order, subsequent versions of the memory puzzle presented to the individual can include such distractions. The quiz unit 150 may configure the memory puzzle to remove distractions, however, if an individual fails a particular version of a memory puzzle (e.g., selects thumbnails in an incorrect order) one or more times. The "intermediate" difficulty setting may include any combination of features of the "easy" difficulty setting and the "hard" difficulty setting.

Furthermore, the memory puzzle system 118 (e.g., the quiz unit 150) may generate versions of the memory puzzle that more frequently alternate among media file types as the difficulty increases. For example, a first version of the memory puzzle may include a first media file including video, a second media file including audio, and a third media file including video, with each having a duration of about 20 seconds. A second, more difficult version of the memory puzzle, however, may include the first media file, the second media file, the third media file, and a fourth media file including audio, with each having a duration of about 5 seconds. Thus, the second version of the memory puzzle may more frequently alternate among media file types (e.g., 3 times instead of 2 times, and every 5 seconds instead of every 20 seconds).

As will be discussed later, the difficulty level may also affect the display of thumbnails in the memory puzzle. For example, if a "hard" difficulty setting is selected, then the thumbnails displayed in the memory puzzle after playback of the media file(s) is complete may not necessarily be extracted from the played media file(s). On the other hand, if an "easy" difficulty setting is selected, then the thumbnails displayed in the memory puzzle after playback of the media file(s) is complete may be extracted from the played media file(s). Nonetheless, if the "easy" difficulty setting is selected and the individual eventually selects the thumbnails of one version of the memory puzzle in a correct order, subsequent versions of the memory puzzle presented to the individual can include some thumbnails extracted from the played media file(s) and/or some thumbnails that are not extracted from the played media file(s).

In some embodiments, the user may select a desired length of the puzzle using puzzle parameter 208B. For example, a user may select a puzzle length of 3 units, and the generated memory puzzle may play three different media files. Thus, each unit may correspond to a single media file. The user may also select a desired puzzle length goal using puzzle parameter 208C. Puzzle parameter 208C may indicate an ultimate number of media files to be played in an associative memory puzzle at the end of a training session. In other words, the selected puzzle parameter 208B may indicate the number of individual items a user would like the individual to remember to begin a training session, and the selected puzzle parameter 208C may indicate the number of individual items a user would like the individual to eventually be able to remember at the end of the training session.

Puzzle parameter 208D, when selected, may cause the memory puzzle to automatically increase in difficulty each time an individual completes a particular version of the memory puzzle. For example, if puzzle parameter 208D is selected, the first version of the memory puzzle may include a number of media files corresponding to the number of units selected via the puzzle parameter 208B. When the individual successfully completes the first version of the memory puzzle (e.g., selects the thumbnails in the correct order), the individual may be presented with a second version of the memory puzzle that includes a number of media files greater than the number of media files corresponding to the number selected via the puzzle parameter 208B (e.g., 1 more than the number selected via the puzzle parameter 208B). This pattern may continue until the individual is presented with a version of the memory puzzle that includes a number of media files corresponding to the number of units selected via the puzzle parameter 208C. When the individual successfully completes this version of the memory puzzle, the memory puzzle may be completed.

If puzzle parameter 208D is not selected, then the memory puzzle may not automatically increase in difficulty each time an individual completes a particular version of the memory puzzle. Rather, the memory puzzle may be completed once the individual successfully completes an initial version of the memory puzzle.

Puzzle parameter 212, when selected, may cause a sound to play when an individual successfully completes a version of a memory puzzle. For example, a "Tada!" sound may play when an individual successfully completes a version of the memory puzzle. No sound may be played if the puzzle parameter 212 is not selected. Visual cues indicating successful completion of a version of a memory puzzle may also be presented to the individual in a user interface, regardless of whether the puzzle parameter 212 is selected.

User interface 200 may also include button 216, which may allow the user to preview a memory puzzle associated with the user-selected puzzle parameters 204A-204C, 208A-208D, and 212. For example, selection of the button 216 may cause the user interface 200 to update to appear like user interface 400, which is described in greater detail below with respect to FIG. 4.

Additionally, user interface 200 may include button 220, which the user may select to assign the memory puzzle to a specific individual or group of individuals. Once assigned, an individual or group of individuals can access the memory puzzle system 118 using a user device 102 to play the assigned memory puzzle.

User interface 200 may also contain various headings associated with the memory puzzle parameters 204A-204C, 208A-208D, and 212. In the particular example of FIG. 2, the user interface 200 includes headings referring to "TYPE OF PUZZLE" "DIFFICULTY," and "SENSORY." However, it will be appreciated that in some embodiments, additional or fewer headings may be presented to the user. In some embodiments, each heading may include subheadings, selections, or options that the user may select to generate a custom memory puzzle, to generate a group of custom memory puzzles, and/or to populate a list of media files associated with the user selection. For example, selection of a theme under the "TYPE OF PUZZLE" heading using puzzle parameter 204A may cause the user interface 200 to display a drop-down menu of available themes as puzzle parameter 204B.

Puzzle parameters 204C, 208D, and 212 may be in the form of check boxes. The check boxes 204C, 208D, and 212 may be configured to accept a user input comprising a mouse click or tap gesture that the user interface unit 160 can use to select the option corresponding to the user input. For example, a user can check box 212, and the media unit 140 can select an audio file associated with a "Tada!" sound to include as part of the memory puzzle.

Selection of the puzzle parameters 204A-204C, 208A-208D, and 212 can be received by the puzzle setup unit 130. In response, the puzzle setup unit 130, in conjunction with the media unit 140 and/or the quiz unit 150, can create a corresponding associative memory puzzle. In particular, the puzzle setup unit 130, the media unit 140, and/or the quiz unit 150 can create one or more versions of the associative memory puzzle, where each version may have a different difficulty level, have a different length (e.g., a different number of media files that are played), and/or include different types of media files. The quiz unit 150 may determine when each version should be presented to an individual, such as after completion or failure of a particular version of the associative memory puzzle. Thus, the quiz unit 150 can link the different versions such that the different versions are presented to an individual in a sequential manner, where the sequence depends on how the individual performs on a previous version of the associative memory puzzle.

As described herein, each media file stored in the data store 170 may be associated with metadata that indicates a title of the file, a duration of the file, which types of sound(s) are pronounced when the media file is played, etc. As an illustrative example, a first video file may include an image of a crocodile and may therefore be associated with metadata that indicates a title of the first video file is "crocodile" and a duration of the video file (e.g., 34 seconds). An audio file may include a recording of a person pronouncing the word "crocodile" and may therefore be associated with metadata indicating the title of the audio file is "crocodile pronunciation" and a duration of the audio file (e.g., 5 seconds). In some embodiments, user interface 200 includes a search tool (not shown). The search tool may be a box configured to accept a user input associated with a search query. For example, the search box may accept alphanumeric text from a user to search for specific images, video clips, audio clips, or other types of content to include in a memory puzzle. The search box may allow a user to search for specific media files based on factors such as subject matter and duration. The puzzle setup unit 130 can receive the search query, and use words, numbers, phrases, or other elements comprised within the search query to query the data store 170. In response, the data store 170 may return an indication of one or more media files that have metadata matching one or more elements of the search query. The puzzle setup unit 130 can then instruct the user interface unit 160 to generate updated user interface data for transmission to a client system 106 such that the updated user interface data, when processed, causes the client system 106 to display an updated user interface 200 that includes an indication of the media file(s) having metadata matching one or more elements of the search query.

FIG. 3 illustrates an example user interface 300 that a user may interact with to set up a sequential task memory puzzle, according to some embodiments. In some embodiments, the sequential task memory puzzle may be used as an educational tool to teach an individual how to perform a specific task (e.g., making pasta, doing the laundry, etc.). The user interface 300 may be displayed on a client system 106 operated by the user. For example, the user interface unit 160 can generate and transmit user interface data to the client system 106 in response to the user attempting to form or access a sequential task memory puzzle. The client system 106 can process the user interface data, which causes the client system 106 to display the user interface 300.

The user interface 300 includes puzzle parameters 304, 306, 312A-312B, and 316. Puzzle parameter 304 allows the user to select whether the memory puzzle will correspond to a predetermined sequential task or a custom sequential task. A predetermined sequential task may be a sequential task created prior to the user accessing the user interface 300 in which the sequential task is associated with one or more steps that each correspond to one or more media files. If the user makes a selection indicating that the memory puzzle will correspond to a predetermined sequential task, then the user interface 300 may display a list of sortable steps, such as sortable steps 308A-308F. If the user makes a selection indicating that the memory puzzle will correspond to a custom sequential task, then the user interface 300 may update to display a window (e.g., a pop-up window) or pane allowing the user to select one or more media files to include in the custom sequential task, where each media file will correspond to one step of the custom sequential task.

If the user makes a selection indicating that the memory puzzle will correspond to a predetermined sequential task, the user interface 300 may update to depict the puzzle parameter 306, which allows the user to select a particular task. For example, the user interface 300 may depict selectable identifications of various tasks (e.g., "Sorting Laundry"). However, in some embodiments, the memory puzzle system 118 (e.g., the puzzle setup unit 130) may automatically and randomly select a task corresponding to the memory puzzle (e.g., if the user leaves the puzzle parameter 306 blank).

In some embodiments, selection of a task via puzzle parameter 306 may cause a number of steps associated with the task to display in the user interface 300. For example, upon selecting the "Sorting Laundry" task, the user interface 300 may display sortable steps 308A, 308B, 308C, 308D, 308E, and 308F, where each sortable step 308A-308F corresponds to a particular step in the overall "Sorting Laundry" sequential task.

Sortable steps 308A-308F each identify a step number and the subject matter or title of the step. For example, sortable step 308B indicates that the step is the second step of the "Sorting Laundry" sequential task and that the step corresponds to putting whites in one pile. The order in which the sortable steps 308A-308F are presented in the user interface 300 (from top to bottom) may be the order in which the corresponding media files are played during the memory puzzle. The steps 308A-308F may be considered sortable because the user can adjust the order in which the steps 308A-308F are displayed in the user interface 300, and therefore the order in which the corresponding media files are played. Thus, the user can sort the sortable steps 308A-308F in an order that is the same or different than the order in which the steps should be performed to complete the associated sequential task. In addition, the user can remove any of the sortable steps 308A-308F and/or add new sortable steps.

While 6 sortable steps 308A-308F are illustrated in FIG. 3, this is not meant to be limiting. The user interface 300 can display any number of sortable steps (e.g., 1, 2, 3, 4, 5, 7, 8, 9, 10, etc.), where the number may depend on the type of task selected by the user.

In some embodiments, after playback of the media files is complete, the individual may be prompted to select the thumbnails in the order in which the media files were played. Thus, the individual may be prompted to select the thumbnails in an order different than the order in which the steps should be performed to complete the associated sequential task (e.g., if the user orders the sortable steps 308A-308F in an order different than the order in which the steps should be performed to complete the associated sequential task). In other embodiments, after playback of the media files is complete, the individual may be prompted to select the thumbnails in the order in which the steps should be performed to complete the associated sequential task, regardless of whether the media files were actually played in the order in which the steps should be performed to complete the associated sequential task. This embodiment may occur if the user sets the difficult setting to "hard" or after the individual has already completed a first version of the memory puzzle and is prompted to complete a second, more difficult version of the memory puzzle.

A user may also determine a difficulty level of the memory puzzle using puzzle parameter 312A. For example, the user can select an "easy," "intermediate," or "hard" difficulty level. In some embodiments, the difficulty level selected using puzzle parameter 312A may determine the amount of time individual media files of a particular memory puzzle are displayed, the type of media files that are displayed, a display order of the media files, a display order of thumbnails, the type of thumbnails that are displayed, a number of times a media file is repeated during the display of the memory puzzle, etc. In some embodiments, the difficulty level may also determine whether various distractions are included in a memory puzzle game. For example, on a "hard" difficulty setting, a memory puzzle may include ambient noise (e.g., static noise), audio unrelated to the displayed video (e.g., a bird chirping even though the video displays a person putting colors in a pile), or sudden visual cues (e.g., a random image) that may distract the individual from the substance or primary focus of the media file. However, on an "easy" difficulty setting, the memory puzzle may not include such distractions. Nonetheless, if the "easy" difficulty setting is selected and the individual eventually selects the thumbnails of one version of the memory puzzle in a correct order, subsequent versions of the memory puzzle presented to the individual can include such distractions. The quiz unit 150 may configure the memory puzzle to remove distractions, however, if an individual fails a particular version of a memory puzzle (e.g., selects thumbnails in an incorrect order) one or more times. The "intermediate" difficulty setting may include any combination of features of the "easy" difficulty setting and the "hard" difficulty setting.

Furthermore, the memory puzzle system 118 (e.g., the quiz unit 150) may generate versions of the memory puzzle that more frequently alternate among media file types as the difficulty increases. For example, a first version of the memory puzzle may include a first media file including video, a second media file including audio, and a third media file including video, with each having a duration of about 20 seconds. A second, more difficult version of the memory puzzle, however, may include the first media file, the second media file, the third media file, and a fourth media file including audio, with each having a duration of about 5 seconds. Thus, the second version of the memory puzzle may more frequently alternate among media file types (e.g., 3 times instead of 2 times, and every 5 seconds instead of every 20 seconds).

In some embodiments, the user may select a desired number of steps to include in the sequential task memory puzzle using puzzle parameter 312A. For example, a user may select a puzzle length of 3 steps, and the generated sequential task memory puzzle may play three media files corresponding to the three steps of the chosen task even if there are more than three steps in the task. The user may also select a desired puzzle length goal using puzzle parameter 312B. Puzzle parameter 312B may indicate an ultimate number of media files to be played in a sequential task memory puzzle at the end of a training session. In other words, the selected puzzle parameter 312A may indicate the number of individual items a user would like the individual to remember to begin a training session, and the selected puzzle parameter 312B may indicate the number of individual items a user would like the individual to eventually be able to remember at the end of the training session.

An additional puzzle parameter in the user interface 300 titled "Automatic difficulty adjustment," when selected, may cause the memory puzzle to automatically increase in difficulty each time an individual completes a particular version of the memory puzzle. For example, if the difficulty adjustment puzzle parameter is selected, the first version of the memory puzzle may include a number of media files corresponding to the number of steps selected via the puzzle parameter 312A. When the individual successfully completes the first version of the memory puzzle (e.g., selects the thumbnails in the correct order), the individual may be presented with a second version of the memory puzzle that includes a number of media files greater than the number of media files corresponding to the number selected via the puzzle parameter 312A (e.g., 1 more than the number selected via the puzzle parameter 312A). This pattern may continue until the individual is presented with a version of the memory puzzle that includes a number of media files corresponding to the number of steps selected via the puzzle parameter 312B. When the individual successfully completes this version of the memory puzzle, the memory puzzle may be completed.

While not shown in FIG. 3, the user interface 300 may include a puzzle parameter that allows a user to select the difficulty level (e.g., "easy," "intermediate," "hard," etc.) of the sequential task memory puzzle. The difficulty setting may operate similar to the difficulty setting described above with respect to FIG. 2.

If the difficulty adjustment puzzle parameter is not selected, then the memory puzzle may not automatically increase in difficulty each time an individual completes a particular version of the memory puzzle. Rather, the memory puzzle may be completed once the individual successfully completes an initial version of the memory puzzle.

In some embodiments, the desired puzzle length goal may be part of a personalized improvement plan associated with the particular user and user profile.

Puzzle parameter 316, when selected, may cause a sound to play when an individual successfully completes a version of a memory puzzle. For example, a "Tada!" sound may play when an individual successfully completes a version of the memory puzzle. No sound may be played if the puzzle parameter 316 is not selected. Visual cues indicating successful completion of a version of a memory puzzle may also be presented to the individual in a user interface, regardless of whether the puzzle parameter 316 is selected.

User interface 300 may include button 320, which may allow the user to preview a memory puzzle associated with the user-selected puzzle parameters 304, 306, 312A-312B, and 316. The button 320 may function similar to the button 216 described above. The user interface 300 may also include button 324, which the user may select to assign the memory puzzle to a specific individual or group of individuals. The button 324 may function similar to the button 220 described above.

User interface 300 may also contain various headings associated with the memory puzzle parameters 304, 306, 312A-312B, and 316. In the particular example of FIG. 3, the user interface 300 includes headings referring to "TYPE OF TASK," "DIFFICULTY," and "SENSORY." However, it will be appreciated that in some embodiments, additional or fewer headings may be presented to the user.

The difficulty adjustment puzzle parameter and the puzzle parameter 316 may be in the form of check boxes. The check box 316, for example, may be configured to accept a user input comprising a mouse click or tap gesture that the user interface unit 160 can use to select the option corresponding to the user input. For example, a user can check box 316, and the media unit 140 can select an audio file associated with a "Tada!" sound to include as part of the memory puzzle.

Selection of the puzzle parameters 304, 306, 312A-312B, and 316 can be received by the puzzle setup unit 130. In response, the puzzle setup unit 130, in conjunction with the media unit 140 and/or the quiz unit 150, can create a corresponding sequential task memory puzzle. In particular, the puzzle setup unit 130, the media unit 140, and/or the quiz unit 150 can create one or more versions of the sequential task memory puzzle, where each version may have a different difficulty level, have a different number of steps or length (e.g., a different number of media files that are played), and/or include different types of media files. The quiz unit 150 may determine when each version should be presented to an individual, such as after completion or failure of a particular version of the sequential task memory puzzle. Thus, the quiz unit 150 can link the different versions such that the different versions are presented to an individual in a sequential manner, where the sequence depends on how the individual performs on a previous version of the sequential task memory puzzle.

As described above, each media file stored in the data store 170 may be associated with metadata that indicates a title of the file, a duration of the file, which types of sound(s) are pronounced when the media file is played, etc. The puzzle setup unit 130 can receive a search query, and use words, numbers, phrases, or other elements comprised within the search query to query the data store 170. In response, the data store 170 may return an indication of one or more media files that have metadata matching one or more elements of the search query. The puzzle setup unit 130 can then instruct the user interface unit 160 to generate updated user interface data for transmission to a client system 106 such that the updated user interface data, when processed, causes the client system 106 to display an updated user interface 300 that includes an indication of the media file(s) having metadata matching one or more elements of the search query.

Figure 4:
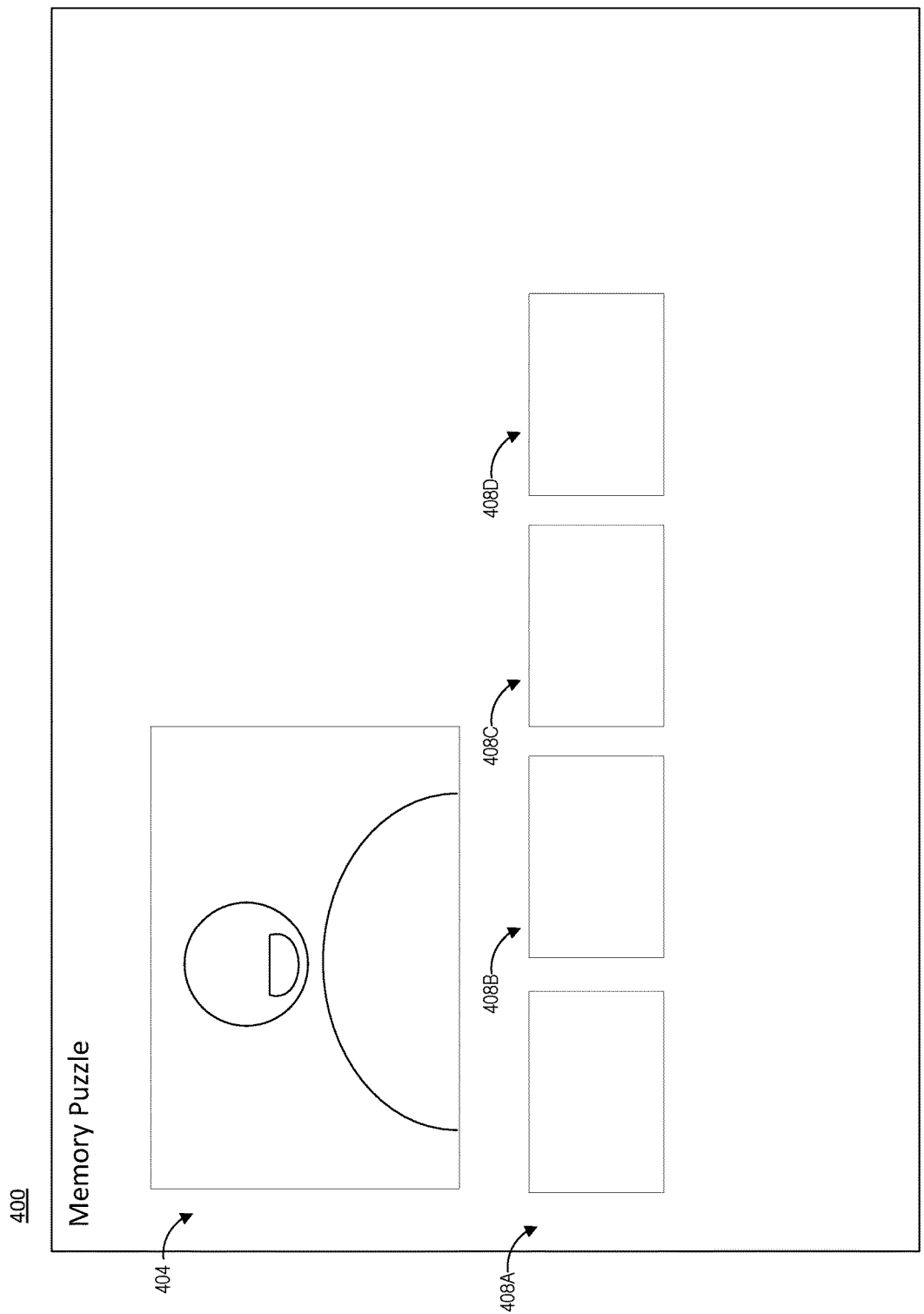
FIG. 4 illustrates an example user interface configured to display a memory puzzle, according to some embodiments.

FIG. 4 illustrates an example user interface 400 configured to display a memory puzzle, according to some embodiments. The user interface 400 may be displayed on a client system 106 operated by a user, such as in response to the user selecting button 216 or 320 to view a preview of an associative memory puzzle or a sequential task memory puzzle. For example, the user interface unit 160 can generate and transmit user interface data to the client system 106 in response to the user selecting button 216 or 320. The client system 106 can process the user interface data, which causes the client system 106 to display the user interface 400. Alternatively, the user interface 400 may be displayed on a user device 102 operated by an individual, such as in response to the individual selecting a memory puzzle assigned to the individual. For example, the user interface unit 160 can generate and transmit user interface data to the user device 102 in response to a user selecting the memory puzzle. The user device 102 can process the user interface data, which causes the user device 102 to display the user interface 400.

The user interface 400 may include a window, box, or pane 404. The window 404 may depict, in a sequential order, one or more media files (e.g., media files selected by the media unit 140 and ordered sequentially by the quiz unit 150). For example, the media file(s) may be played in sequence and in a random order determined by the quiz unit 150.

As mentioned above, the playback of each media file may include the playback of one or more video files and/or one or more audio files. The playback of the video file(s) and the audio file(s) can be sequential, concurrent, or any combination thereof. In embodiments in which video and audio file(s) are played concurrently, the audio file(s) may include a person pronouncing a particular word or sequential task repeatedly for the duration of the concurrently played video file(s). The number of repetitions of the audio or video file(s) may be based at least partly on a user-selected difficulty. For example, if an "easy" difficulty setting is selected, then the audio file may be repeatedly presented or played to reinforce what is being displayed during playback of the video file. However, if a "hard" difficulty setting is selected, the audio file may instead only be presented or played one time.

User interface 400 may also include windows, boxes, or panes 408A, 408B, 408C, and 408D. Windows 408A-408D may remain empty while the media file(s) are played in the window 404. Once playback of the media file(s) is complete, then window 404 may disappear and windows 408A-408D may each display a thumbnail associated with the media file(s) previously displayed in window 404. The number of displayed windows 408A-408D may match the number of media files played in the window 404. In the example illustrated in FIG. 4, four media files may have been played in window 404, resulting in the four windows 408A-408D. As an illustrative example, media files 1-4 may have been played in window 404 in order from media file 1 to media file 4. After playback of media files 1-4 is complete and such media files are no longer visible in the user interface 400, window 408A may display the first frame of media file 1, window 408B may display the third frame of media file 4, window 408C may display the 30th frame of media file 2, and window 408D may display the 10th frame of media file 3. As will be discussed in connection with FIG. 6, a user (e.g., when previewing a memory puzzle) or an individual (e.g., when attempting to complete the memory puzzle) may select each of the displayed thumbnails to complete the quiz associated with the memory puzzle. Although only windows 408A-408D are displayed in user interface 400, it will be appreciated that fewer or additional windows may be displayed in other embodiments.

Figure 5:
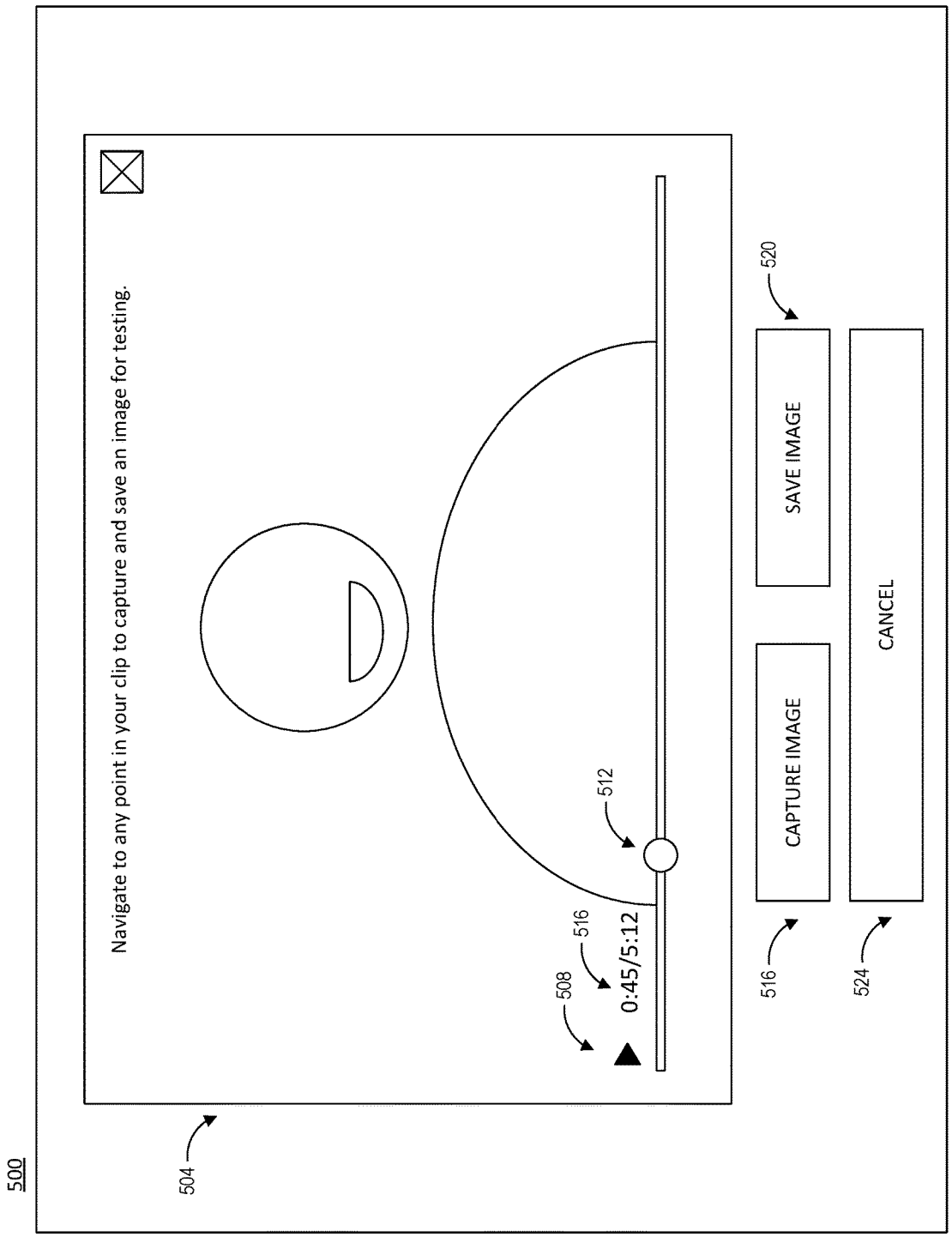
FIG. 5 illustrates an example user interface configured to allow a user to choose a thumbnail for display in a memory puzzle, according to some embodiments.

FIG. 5 illustrates an example user interface 500 configured to allow a user to choose a thumbnail for display in a memory puzzle, according to some embodiments. The user interface 500 may be displayed on a client system 106 operated by a user, such as in response to the user attempting to create a thumbnail for a media file prior to forming a memory puzzle that includes the media file. For example, the user interface unit 160 can generate and transmit user interface data to the client system 106 in response to the user attempting to create the thumbnail. The client system 106 can process the user interface data, which causes the client system 106 to display the user interface 500.

User interface 500 may include window 504, which displays a video file from which a thumbnail can be extracted. Window 504 may include a number of control elements allowing a user to play, pause, stop, etc. the video file and/or to skip to certain portions of the video file. In some embodiments, the window 504 may display control elements 508 and 512 to allow the user to manipulate or otherwise control the viewing experience of the video. For example, in the example of FIG. 5, control element 508 is a play button allowing the user to initiate playback of the video file. Selection of the control element 508 as a play button may cause the video file to play and the control element 508 to transform into a pause or stop button. Control element 512 is a slider allowing the user to view a frame of the video file at or begin playing the video file from a selected starting point defined by the slider's position. The window 504 may also include a time display 516 displaying the total duration of the video and the timestamp corresponding to the slider's current position. It will be appreciated that, in other embodiments, window 504 may display a variety of other control options or features (e.g., a pause button, a stop button, a fast forward button, a rewind button, etc.).

In the example of FIG. 5, user interface 500 also displays buttons 516, 520, and 524. After navigating to a desired video frame in window 504, a user may select button 516 to capture a thumbnail of the video file at the selected timestamp. For example, selection of the button 516 may cause the client system 106 to save as a thumbnail a frame of the video file corresponding to the position of the slider when the button 516 was selected. The client system 106 can then transmit the thumbnail to the memory puzzle system 118 for storage in the data store 170 in an entry associate with the media file from which the thumbnail originated.

In some embodiments, the captured thumbnail may be stored in data store 170 to be used in any memory puzzle which utilizes the video file displayed in window 504. The user may also select button 520 to save the image for future use, where the saved thumbnail may be stored in data store 170. The user may also select button 524 if the user decides not to capture a thumbnail from the video file displayed in window 504.

Optionally, the quiz unit 150 can automatically determine a thumbnail for a media file without any user interaction. For example, the quiz unit 150 can retrieve a media file from the data store 170 and can process one or more frames of the video file to determine the content of the frame(s). In particular, the quiz unit 150 can use object recognition to identify one or more objects depicted in a frame, can use a trained artificial intelligence model (e.g., a machine learning model, a neural network, etc., optionally trained using frames annotated to identify what object(s) are present or described therein) that outputs an identification of object(s) depicted or described in a frame given a frame as an input, can use speech recognition to identify one or more objects described in one or more frames, etc. As described above, a media file can be associated with metadata identifying, among other things, a title or subject matter of the media file. Thus, the quiz unit 150 can determine the content of one or more frames, and compare the content to the title or subject matter of the media file. If the content of a frame matches or is similar to the title or subject matter of the media file, the quiz unit 150 can select the frame as the thumbnail.

Figure 6:
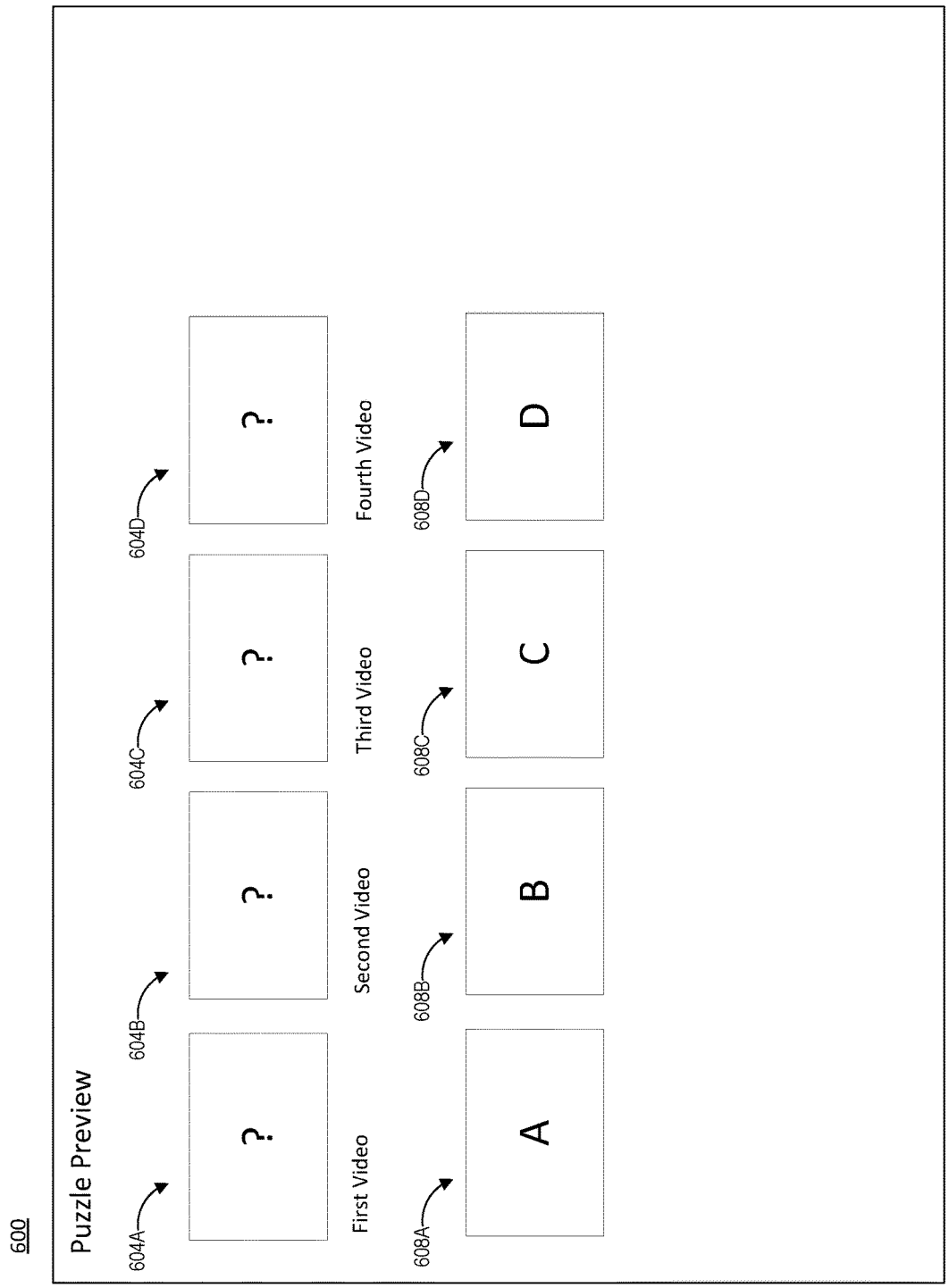
FIG. 6 illustrates an example user interface configured to display a quiz associated with a memory puzzle, according to some embodiments.

FIG. 6 illustrates an example user interface 600 configured to display a quiz associated with a memory puzzle, according to some embodiments. The user interface 600 may be displayed on a client system 106 operated by a user, such as in response to the user selecting button 216 or 320 to view a preview of an associative memory puzzle or a sequential task memory puzzle and after playback of one or more media files is complete. For example, the user interface unit 160 can generate and transmit user interface data to the client system 106 in response to the user selecting button 216 or 320 and after playback of the media file(s) is complete. The client system 106 can process the user interface data, which causes the client system 106 to display the user interface 600. Alternatively, the user interface 600 may be displayed on a user device 102 operated by an individual, such as in response to the individual selecting a memory puzzle assigned to the individual and after playback of one or more media files is complete. For example, the user interface unit 160 can generate and transmit user interface data to the user device 102 in response to a user selecting the memory puzzle and after playback of the media file(s) is complete. The user device 102 can process the user interface data, which causes the user device 102 to display the user interface 600.

After viewing a memory puzzle as displayed in FIG. 4 (e.g., the playback of one or more media files), the user may be presented with user interface 600. User interface 600 may include windows, boxes, or panes 604A, 604B, 604C, 604D, 608A, 608B, 608C, and 608D. Windows 608A-608D may each display a captured thumbnail associated with a media file displayed as part of the memory puzzle in a manner as described above with respect to FIG. 4. In some embodiments, the order in which the thumbnails are displayed may be determined by the quiz unit 150 randomly such that the order in which the thumbnails are displayed does not necessarily correlate to the order in which the media files were played. For example, assuming video files 1, 2, 3, and 4 were played sequentially in that exact order, window 608A may display a thumbnail from video file 4, window 608B may display a thumbnail from video file 2, window 608C may display a thumbnail from video file 1, and window 608D may display a thumbnail from video file 3.

In some embodiments, windows 608A-608D may be selectable by a user to populate windows 604A-604D. For example, window 604A may be configured to display the first thumbnail among the thumbnails displayed in windows 608A-608D to be selected by the individual (or user), window 604B may be configured to display the second thumbnail among the thumbnails displayed in windows 608A-608D to be selected by the individual (or user), window 604C may be configured to display the third thumbnail among the thumbnails displayed in windows 608A-608D to be selected by the individual (or user), and window 604D may be configured to display the fourth thumbnail among the thumbnails displayed in windows 608A-608D to be selected by the individual (or user).

If the individual (or user) selects the thumbnails in the order in which the media files were played, the user interface 600 may produce an audible and/or visual indication that the thumbnails were selected in the correct order. Otherwise, if the individual (or user) selects the thumbnails in an order that does not correspond to the order in which the media files were played, the user interface 600 may produce an audible and/or visual indication that the thumbnails were not selected in the correct order. For example, the user interface 600 may include a check mark within a window 604A-604D if a thumbnail selected for the window 604A-604D was selected in the correct order and may include an X mark within a window 604A-604D if a thumbnail selected for the window 604A-604D was selected in the incorrect order. Optionally, the check mark and/or the X mark may be positioned adjacent to a smaller thumbnail indicating the thumbnail that should have been selected for the respective window 604A-604D.

Although only four thumbnail windows are displayed in FIG. 6, it will be appreciated that fewer or additional windows may be displayed depending on the length of the memory puzzle. For example, the number of thumbnail windows may match the number of media files played during the memory puzzle.

In some embodiments, the displayed thumbnails may not be extracted from the played media files. For example, if the memory puzzle theme is "At the Zoo" and a "hard" difficulty setting is selected, then the user interface 400 may display a media file depicting content of a specific zoo, but the user interface 600 may present a thumbnail of a zoo not previously shown or heard during playback of the media file or any other media file selected for the memory puzzle. Thus, the memory puzzle can test whether the individual understands the content of the media file or merely memorized the frames of the media file without understanding the underlying subject matter depicted therein.

Figure 7:
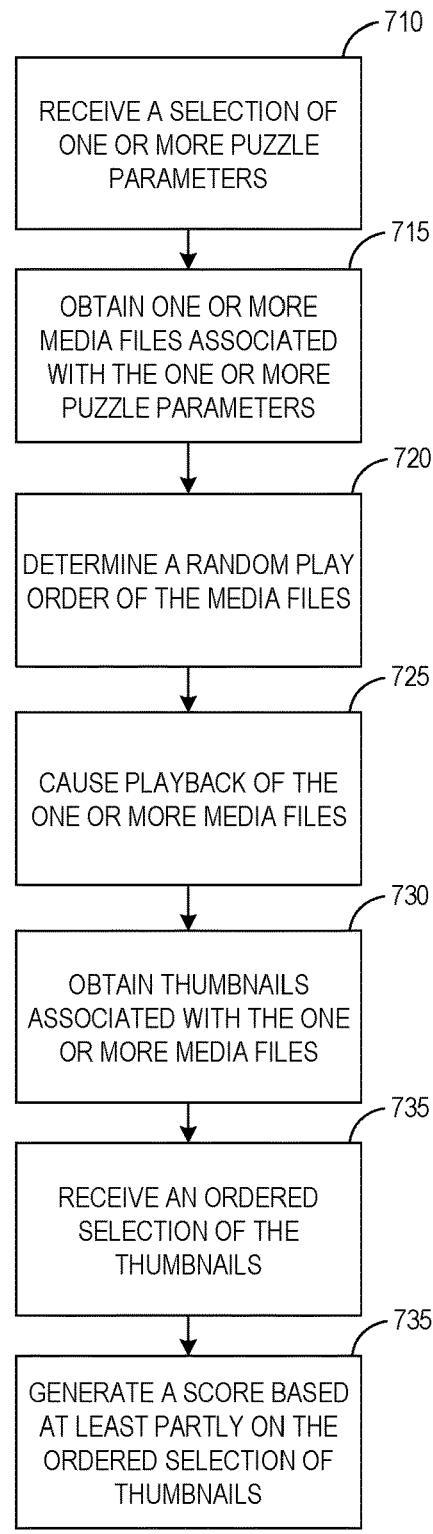
FIG. 7 is a flow diagram of an example memory puzzle method, according to some embodiments.

FIG. 7 is a flow diagram of an example memory puzzle method. The example memory puzzle method may be implemented by the memory puzzle system 118 (e.g., the puzzle setup unit 130, the media unit 140, the quiz unit 150, and/or the user interface unit 160).

At block 710, the memory puzzle system 118 may receive a selection of one or more memory puzzle parameters. In some embodiments, the selection may comprise a series of mouse clicks on a network page (e.g., a content page, a web page, etc.) served by the memory puzzle system 118 (e.g., a series of selections in user interface 200 or user interface 300). The one or more puzzle parameters may be associated with a number of puzzle modifiers. For example, a first puzzle parameter may be associated with a memory puzzle type, a second puzzle parameter may be associated with a puzzle difficulty level, and a third puzzle parameter may be associated with a puzzle length.

At block 715, the memory puzzle system 118 may obtain one or more media files associated with the one or more puzzle parameters. For example, the media file(s) can be obtained from the data store 170. In some embodiments, each media file stored in the memory puzzle system 118 may be associated with a title, a duration, one or more categories, an address, description, tag, pointer, or numerical value. For example, a media file may be associated with the numerical value "5" to indicate that the video file corresponds to an enumerated category. In some embodiments, each media file may be mapped to a particular puzzle parameter. For example, a video file illustrating an animal kept in a zoo may be associated with a theme puzzle parameter that identifies the theme "At the Zoo." In some embodiments, the number of media files selected may be based at least partly on user-selected puzzle parameters. For example, if the user selected a puzzle theme "At the Zoo" and puzzle length of 3 units, then the memory puzzle system 118 may select 3 video files associated with the "At the Zoo" theme puzzle parameter. In some embodiments, the memory puzzle system 118 may also select 3 audio files corresponding to the selected videos.

In some embodiments, the memory puzzle system 118 may determine a random play order of the selected media files at block 720. For example, a first individual that plays the memory puzzle may observe the media files being played in a first order. A second individual that plays the memory puzzle, however, may observe the media files being played in a second order different than the first order.

The memory puzzle system 118 may cause playback of the one or more media files at block 725. In some embodiments, the memory puzzle system 118 may cause playback of the one or more media files in the order determined in block 720. For example, if video files 1, 2, and 3 were chosen to be part of a memory puzzle and the memory puzzle system 118 determined a play order such that video file 2 is displayed first, video file 1 is displayed second, and video file 3 is displayed third, then the user interface unit 160 may generate user interface data that, when rendered by a user device 102 or a client system 106, may cause the user device 102 or client system 106 to display the user interface 400, where the user interface 400 may play the video files in that exact order. In some embodiments, the media files may be played on user device 102 or client system 106.

The memory puzzle system 118 may obtain a selection of thumbnails associated with the one or more media files at block 730. As discussed above, the thumbnails may initially be selected by a user and stored in data store 170. When a memory puzzle is created, the memory puzzle system 118 may utilize a thumbnail already stored on data store 170 to form the memory puzzle quiz. In some embodiments, the thumbnails associated with a media file may be chosen randomly from a pool of available thumbnails associated with the particular media file.

The memory puzzle system 118 may generate a score based at least partly on the ordered selection of thumbnails at block 735. In some embodiments, the generated score may be a numeric value between 0 and 1. For example, if an individual correctly selects two out of four thumbnails in the correct order, the memory puzzle system 118 may generate a score of 0.5, indicating that the individual correctly selected 50% of the thumbnails. In some embodiments, the memory puzzle system 118 may track the performance of an individual across multiple memory puzzles. For example, the memory puzzle system 118 may track the number of puzzles played and the difficulty level of the puzzles played by the individual. By tracking an individual's statistics, the memory puzzle system 118 may determine an overall performance level for the individual based at least partly on the individual's completion of various puzzles and the puzzles' identifier information. By observing an individual's performance on various memory puzzles, a user may create memory puzzles personalized to particular individuals and assign the personalized memory puzzles to the individuals. Alternatively or in addition, the memory puzzle system 118 can suggest media files and/or memory puzzles to assign to an individual based on the individual's past performance (e.g., harder memory puzzles if the individual continues to correctly solve or complete the objectives of previous memory puzzles, and easier memory puzzles if the individual inconsistently correctly solves or completes the objectives of previous memory puzzles), the types of media files previously displayed or played to the individual, types of media files that the individual may prefer (e.g., audio files, video files, media files corresponding to a particular theme, etc.), etc. In some embodiments, the memory puzzle system 118 may automatically determine a difficulty level for an individual based at least partly on collected data regarding the individual's past performance (e.g., memory puzzles may become harder if the individual continues to correctly solve or complete the objectives of previous memory puzzles, and memory puzzles may become easier if the individual inconsistently correctly solves or completes the objectives of previous memory puzzles) on previous memory puzzles and may automatically generate or suggest memory puzzles of an appropriate difficulty level.

Optionally, the memory puzzle system 118 can assign a level of performance to the individual playing the memory puzzle. The individual may improve the level of performance by playing, and completing more memory puzzles, and completing the objectives of the memory puzzles. The individual may successfully complete a series of assignments and may earn experience points as a reward. The individual may then progress to a higher level after a specified number of experience points may have been gained by the individual at any particular level. The level of difficulty may also increase with an increase in the level of performance. The individual may be prompted to solve memory puzzles of an increased difficulty while progressing to higher levels of performance. This may motivate the individual to play with an increased vigor to improve his or her level. The information about the individual, the memory puzzles played by the individual, the experience points gained by the individual, and/or the individual's level of performance can be stored in the individual's user profile.

Optionally, the memory puzzle system 118 (e.g., the user interface unit 160) can generate user interface data for rendering a user interface that shows a projected improvement plan based on the memory puzzles played by an individual, and the performance of the individual on the memory puzzles. The memory puzzle system 118 can analyze the individual's performance in the memory puzzles that may have been played by the individual. The analysis of memory puzzles may include the number of memory puzzles played, the number of memory puzzles where the individual may have completed the objective of the memory puzzle, and/or the level of difficulty of the memory puzzles played. Therefore, the memory puzzle system 118 may display a projected improvement plan for the individual. The projected improvement plan may be displayed in a user interface (to the individual and/or user) in terms of experience points that the individual may gain, and the number of memory puzzles that the individual may require to reach a particular level of improvement. The projected improvement plan may allow the users (e.g., trainers, teachers, parents, therapists, etc.) and/or the memory puzzle system 118 to tweak the memory puzzles and memory puzzle plans for the individuals as and when required so that the improvement of the individual may be optimized. Further, the projected improvement plan may also allow an individual to view improvement made and the improvement that may be made at the rate at which the individual may be playing the memory puzzles, and completing the objectives of the memory puzzles.

Figure 8:
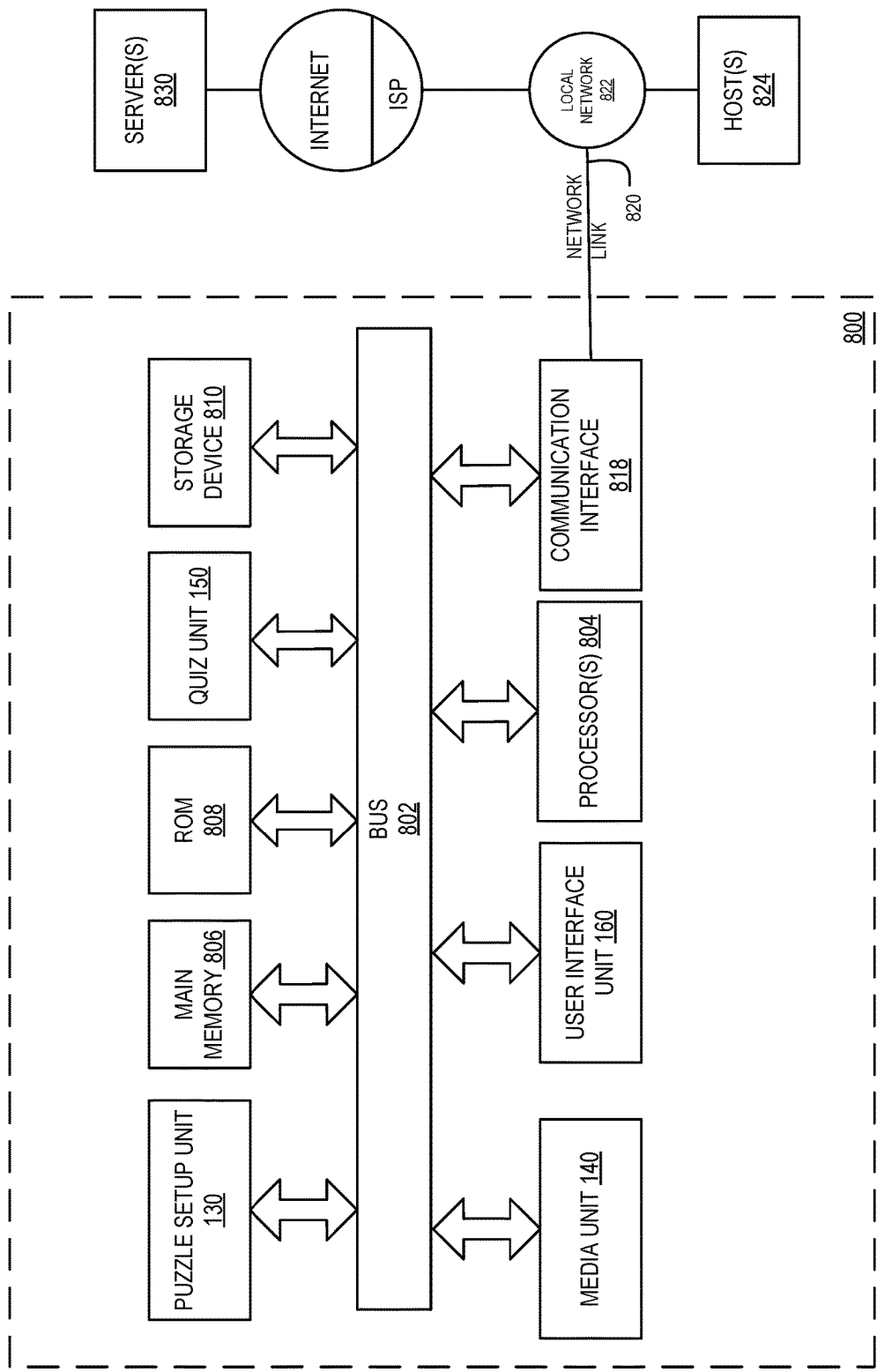
FIG. 8 is a block diagram of an example computing system configured to implement the memory puzzle system described herein, according to some embodiments.

FIG. 8 is a block diagram of an illustrative computing system 800 that may implement one or more of the features described. The computing system 800 may be configured to perform all or some of the features of the memory puzzle system 118. The computing system 800 includes a bus 802 or other communication mechanism for communicating information, and a hardware processor, or multiple processors, 804 coupled with bus 802 for processing information. Hardware processor(s) 804 may be, for example, one or more general purpose microprocessors.

The computing system 800 also includes a main memory 806, such as a random access memory (RAM), cache, or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render the computing system 800 into a special-purpose machine that is customized to perform the operations specified in the instructions.

The computing system 800 further includes a read only memory (ROM) 508 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

The computing system 800 may further, as described below, implement the techniques described herein using customized hard-wired logic, one or more application specific integrated circuits (ASICs) or field programmable gate arrays (FPGAs), firmware and/or program logic which in combination with the computer system causes or programs the computing system 800 to be a special-purpose machine. According to one embodiment, the techniques herein may be performed by the computing system 800 in response to processor(s) 804 executing one or more sequences of one or more computer readable program instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

As part of a special-purpose machine, the computing system 800 may include puzzle setup unit 130, media unit 140, quiz unit 150, and user interface unit 160. According to one embodiment, puzzle setup unit 130 may receive as input one or more selections of memory puzzle parameters. In some embodiments, media unit 140 may select and group media files associated with the puzzle parameters, and quiz unit 150 may generate a memory puzzle quiz associated with the selected puzzle parameters and selected media files.

Various forms of computer readable storage media may be involved in carrying one or more sequences of one or more computer readable program instructions to processor 804 for execution. For example, the instructions may initially be carried on a magnetic disk or solid state drive of a remote computer. The bus 802 may carry data to main memory 806, from which processor 804 retrieves and executes the instructions. The instructions received by main memory 806 may optionally be stored on storage device 810 either before or after execution by processor 804. Additionally, main memory 806 may store a plurality of video files for the memory puzzle system.

The computing system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN (or WAN component to communicate with a WAN). Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the Internet 828 to a server 830.

While the user device 102, the client system 106, and the memory puzzle system 118 are described herein as performing certain operations, this is not meant to be limiting. For example, the client system 106 can perform some or all of the operations described herein as being performed by the memory puzzle system 118. Thus, the client system 106 can create and/or run a memory puzzle locally. Similarly, the user device 102 can perform some or all of the operations described herein as being performed by the memory puzzle system 118. Thus, the user device 102 can create and/or run a memory puzzle locally. Conversely, the memory puzzle system 118 can perform some or all of the operations described herein as being performed by the user device 102 and/or the client system 106. Accordingly, the memory puzzle and operations described herein can be accessible and/or run via a network (e.g., using a browser or other mobile application running on the user device 102 and/or the client system 106), can be implemented in a mobile application run locally on the user device 102 and/or the client system 106, can be implemented in a desktop application run locally on the user device 102 and/or the client system 106, can be implemented in a network application (e.g., a web application) run on the memory puzzle system 118, and/or any combination thereof.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or one or more computer processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a similarity detection system, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A similarity detection system can be or include a microprocessor, but in the alternative, the similarity detection system can be or include a controller, microcontroller, or state machine, combinations of the same, or the like configured to estimate and communicate prediction information. A similarity detection system can include electrical circuitry configured to process computer-executable instructions. Although described herein primarily with respect to digital technology, a similarity detection system may also include primarily analog components. For example, some or all of the prediction algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a similarity detection system, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An illustrative storage medium can be coupled to the similarity detection system such that the similarity detection system can read information from, and write information to, the storage medium. In the alternative, the storage medium can be integral to the similarity detection system. The similarity detection system and the storage medium can reside in an ASIC. The ASIC can reside in a user terminal. In the alternative, the similarity detection system and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
a non-transitory computer-readable storage medium storing computer-executable instructions; and
one or more hardware processors in communication with the computer-readable memory, wherein the executable instructions, when executed by the one or more hardware processors, cause the one or more hardware processors to at least:
process a selection of one or more puzzle parameters;
obtain one or more media files associated with the one or more parameters;
determine an order in which to play the one or more media files;
cause a user interface to play the one or more media files in the determined order;
obtain a plurality of thumbnails associated with the one or more media files, wherein the plurality of thumbnails are displayed in the user interface in a second order different than the determined order after playback of the one or more media files is complete;
process an ordered selection of the plurality of thumbnails received via the user interface; and
generate a score based at least partly on the ordered selection of the thumbnails.

2. The system of claim 1, wherein the executable instructions, when executed, further cause the one or more hardware processors to at least:
assign the one or more media files to a first user; and
transmit the one or more media files to a user device associated with the first user.

3. The system of claim 1, wherein the one or more puzzle parameters comprises at least one of a puzzle type, a puzzle difficulty, or a puzzle length.

4. The system of claim 3, wherein the puzzle difficulty comprises one of an easy difficulty level, an intermediate difficulty level, or a hard difficulty level.

5. The system of claim 1, wherein the one or more media files comprise at least one of an image file, a video file, an audio file, or an animation.

6. The system of claim 1, wherein the executable instructions, when executed, further cause the one or more hardware processors to at least determine randomly the order in which to play the one or more media files.

7. The system of claim 1, wherein the determined order of the one or more media files is based at least partly on the one or more puzzle parameters.

8. The system of claim 1, wherein a first thumbnail in the plurality of thumbnails is associated with a first media file in the one or more media files, and wherein the executable instructions, when executed, further cause the one or more hardware processors to at least:
instruct a user device displaying the user interface to capture images of a user;
process the images to determine an instance in which a gaze of the user is in a direction other than a direction of a screen of the user device; and
generate the first thumbnail to include a frame of the first media file played at a time corresponding to the instance in which the gaze of the user is in the direction other than the direction of the screen of the user device.

9. The system of claim 1, wherein a first thumbnail in the plurality of thumbnails is a frame of a first media file in the one or more media files.

10. The system of claim 1, wherein a first thumbnail in the plurality of thumbnails is associated with a first media file in the one or more media files, and wherein the first thumbnail is an image that does not originate from the first media file.

11. A computer-implemented method comprising:
receiving a selection of one or more puzzle parameters;
obtaining one or more media files associated with the one or more parameters;
determining an order in which to play order of the one or more media files;
causing a user interface to play the one or more media files in the determined order;
obtaining a plurality of thumbnails associated with the one or more media files, wherein the plurality of thumbnails are displayed in the user interface in a second order different than the determined order after playback of the one or more media files is complete;
receiving an ordered selection of the plurality of thumbnails via the user interface; and
generating a score based at least partly on the ordered selection of the thumbnails.

12. The computer-implemented method of claim 11, further comprising:
assigning the one or more media files to a first user; and
transmitting the one or more media files to a user device associated with the first user.

13. The computer-implemented method of claim 11, wherein the one or more puzzle parameters comprises at least one of a puzzle type, a puzzle difficulty, or a puzzle length.

14. The computer-implemented method of claim 13, wherein the puzzle difficulty comprises one of an easy difficulty level, an intermediate difficulty level, or a hard difficulty level.

15. The computer-implemented method of claim 11, wherein the one or more media files comprise at least one of an image file, a video file, an audio file, or an animation.

16. The computer-implemented method of claim 11, wherein determining an order in which to play order of the one or more media files further comprises determining randomly the order in which to play the one or more media files.

17. The computer-implemented method of claim 11, wherein a first thumbnail in the plurality of thumbnails is associated with a first media file in the one or more media files, and wherein the computer-implemented method further comprises:
instructing a user device displaying the user interface to capture images of a user;
processing the images to determine an instance in which a gaze of the user is in a direction other than a direction of a screen of the user device; and
generating the first thumbnail to include a frame of the first media file played at a time corresponding to the instance in which the gaze of the user is in the direction other than the direction of the screen of the user device.

18. The computer-implemented method of claim 11, wherein a first thumbnail in the plurality of thumbnails is a frame of a first media file in the one or more media files.

19. The computer-implemented method of claim 11, wherein a first thumbnail in the plurality of thumbnails is associated with a first media file in the one or more media files, and wherein the first thumbnail is an image that does not originate from the first media file.

20. Non-transitory, computer-readable storage media comprising computer-executable instructions, wherein the computer-executable instructions, when executed by a computer system, cause the computer system to:
process a selection of one or more puzzle parameters;
obtain one or more media files associated with the one or more parameters;
determine an order in which to play the one or more media files;
cause a user interface to play the one or more media files in the determined order;
obtain a plurality of thumbnails associated with the one or more media files, wherein the plurality of thumbnails are displayed in the user interface in a second order after playback of the one or more media files is complete;
process an ordered selection of the plurality of thumbnails received via the user interface; and
generate a score based at least partly on the ordered selection of the thumbnails.

* * * * *